US012655620B2

(12) United States Patent
Ward et al.

(10) Patent No.: US 12,655,620 B2
(45) Date of Patent: Jun. 16, 2026

(54) SYSTEM AND METHOD FOR ASSEMBLING AND/OR OPERATING CONTROL SWITCH IN RELATION TO WASTE DISPOSER AND IN RELATION TO ALTERNATIVE ELECTRIC POWER SOURCES

(71) Applicant: INSINKERATOR LLC, Benton Harbor, MI (US)

(72) Inventors: Jeffrey Ward, Kenosha, WI (US); Kelly T. Gamble, Waterford, WI (US); Dane Hofmeister, Mount Pleasant, WI (US)

(73) Assignee: INSINKERATOR LLC, Benton Harbor, MI (US)

( * ) Notice: Subject to any disclaimer, the term of this patent is extended or adjusted under 35 U.S.C. 154(b) by 0 days.

(21) Appl. No.: 19/047,357

(22) Filed: Feb. 6, 2025

(65) Prior Publication Data

US 2025/0179783 A1      Jun. 5, 2025

Related U.S. Application Data

(63) Continuation of application No. PCT/US2023/029928, filed on Aug. 10, 2023, which
(Continued)

(51) Int. Cl.
*E03C 1/266*          (2006.01)
*H02K 5/22*           (2006.01)

(52) U.S. Cl.
CPC ........... *E03C 1/2665* (2013.01); *H02K 5/225* (2013.01)

(58) Field of Classification Search
CPC . B02C 18/0092; B02C 18/0084; B02C 23/36; E03C 1/266; E03C 1/2665
See application file for complete search history.

(56) References Cited

U.S. PATENT DOCUMENTS 2,244,402 A     6/1941   Powers
2,477,686 A     8/1949   Coss
(Continued)

FOREIGN PATENT DOCUMENTS

CN          2429070 Y     5/2001
CN       101911623 A     12/2010
(Continued)

OTHER PUBLICATIONS

PCT/US2023/029928 International Search Report and Written Opinion of the International Searching Authority dated Nov. 30, 2023 (16 pages).

*Primary Examiner* — Bobby Yeonjin Kim
(74) *Attorney, Agent, or Firm* — BROOKS KUSHMAN P.C.

(57)          ABSTRACT

Waste disposer systems and assemblies and related mechanisms and assemblies, and related methods, are disclosed. In an example embodiment, a food waste disposer includes a motor, a switch module coupled to the motor and operable to control a power flow to the motor, and a housing including a bottom housing portion and a top housing portion, where the switch module and motor are supported within an interior region within the housing. Each of the bottom housing portion and the switch module are configured to be capable of being coupled, at respectively a first time and a second time, to each of a terminal assembly by which the food waste disposer can receive first power from a hard-wired power link, and a power cord assembly by which the food waste disposer can receive second power from a wall power outlet, respectively.

17 Claims, 21 Drawing Sheets

Related U.S. Application Data is a continuation-in-part of application No. 17/885,824, filed on Aug. 11, 2022, now Pat. No. 12,410,595.

(60) Provisional application No. 63/522,220, filed on Jun. 21, 2023.

(56) References Cited

U.S. PATENT DOCUMENTS

| | | | |
|---|---|---|---|
| 2,579,400 A | 12/1951 | Schindler | |
| 2,642,232 A * | 6/1953 | Drew | E03C 1/2665 241/46.016 |
| 2,657,397 A * | 11/1953 | Drew | E03C 1/2665 241/46.016 |
| 2,678,775 A | 5/1954 | Simmons | |
| 2,850,244 A * | 9/1958 | James | E03C 1/2665 241/32.5 |
| 2,860,834 A | 11/1958 | Freda | |
| 2,961,172 A | 11/1960 | Wieczorek et al. | |
| 2,979,274 A * | 4/1961 | Tull | E03C 1/2665 285/31 |
| 3,090,900 A | 5/1963 | Porter et al. | |
| 3,207,837 A | 9/1965 | Brezosky | |
| 3,423,660 A | 1/1969 | McClure | |
| 3,425,637 A | 2/1969 | Enright et al. | |
| 3,464,638 A | 9/1969 | Enright et al. | |
| 3,504,863 A | 4/1970 | Burkland et al. | |
| 4,473,789 A | 9/1984 | Hildebrandt et al. | |
| 5,975,938 A | 11/1999 | Libby | |
| 6,071,132 A | 6/2000 | Cook | |
| 6,082,643 A | 7/2000 | Kovacs | |
| 6,200,155 B1 | 3/2001 | Chudkosky et al. | |
| 6,610,942 B1 | 8/2003 | Anderson et al. | |
| 6,719,228 B2 | 4/2004 | Berger et al. | |
| 6,735,791 B1 | 5/2004 | Var Lordahl et al. | |
| 6,905,360 B2 | 6/2005 | Berger et al. | |
| 7,021,574 B2 | 4/2006 | Berger et al. | |
| 7,210,949 B2 | 5/2007 | Duncan et al. | |
| 7,264,188 B2 | 9/2007 | Anderson et al. | |
| 7,503,514 B2 | 3/2009 | Berger et al. | |
| 7,744,419 B2 | 6/2010 | Blum et al. | |
| 7,757,981 B2 | 7/2010 | Anderson et al. | |
| 7,936,242 B2 | 5/2011 | Carpenter | |
| 8,382,492 B2 | 2/2013 | Hering et al. | |
| 8,794,987 B2 | 8/2014 | Classen et al. | |
| 9,139,990 B2 | 9/2015 | Bennage | |
| 9,145,666 B2 | 9/2015 | Hammer | |
| 9,642,035 B2 | 5/2017 | Fang et al. | |
| 9,968,940 B2 | 5/2018 | Hartmann et al. | |
| 10,063,411 B2 | 8/2018 | Khotimsky et al. | |
| 10,559,907 B1 | 2/2020 | Baldwin et al. | |
| 10,981,178 B2 | 4/2021 | Britto | |
| 11,441,302 B2 | 9/2022 | Reidel et al. | |
| 11,532,909 B2 * | 12/2022 | Weaver | H01R 4/48 |
| 12,110,672 B2 | 10/2024 | Ward et al. | |
| 2004/0053523 A1 | 3/2004 | Berger et al. | |
| 2004/0077224 A1 | 4/2004 | Marchese | |
| 2004/0178289 A1 | 9/2004 | Jara-Almonte et al. | |
| 2006/0038047 A1 | 2/2006 | Anderson et al. | |
| 2006/0065423 A1 | 3/2006 | Gesue | |
| 2006/0144975 A1 | 7/2006 | Anderson et al. | |
| 2008/0149388 A1 | 6/2008 | Kiely et al. | |
| 2008/0210465 A1 | 9/2008 | Fitch et al. | |
| 2010/0130042 A1 | 5/2010 | Gray | |
| 2012/0282814 A1 | 11/2012 | Houdek | |
| 2014/0007036 A1 | 1/2014 | Alpert et al. | |
| 2015/0115081 A1 | 4/2015 | Gormley et al. | |
| 2015/0380877 A1 | 12/2015 | McRae | |
| 2016/0053473 A1 | 2/2016 | Hartmann et al. | |
| 2018/0123895 A1 | 5/2018 | Khasnabish et al. | |
| 2019/0013714 A1 | 1/2019 | DeYoung | |
| 2019/0210036 A1 | 7/2019 | Chavez | |
| 2021/0032853 A1 | 2/2021 | Reidel et al. | |
| 2021/0087801 A1 * | 3/2021 | Ward | H01R 13/73 |
| 2021/0238834 A1 * | 8/2021 | Ward | H01R 25/006 |
| 2022/0120069 A1 * | 4/2022 | Reidel | B02C 18/0092 |
| 2022/0356687 A1 | 11/2022 | Lines | |
| 2022/0381016 A1 | 12/2022 | Dan et al. | |

FOREIGN PATENT DOCUMENTS

| | | |
|---|---|---|
| CN | 203206043 U | 9/2013 |
| CN | 104728182 A | 6/2015 |
| CN | 204753748 U | 11/2015 |
| CN | 205617508 U | 10/2016 |
| CN | 205900911 U | 1/2017 |
| CN | 103503377 B | 10/2017 |
| CN | 107713770 A | 2/2018 |
| CN | 208423310 U | 1/2019 |
| CN | 106714972 B | 10/2019 |
| CN | 111218964 A | 6/2020 |
| CN | 115038847 A | 9/2022 |
| CN | 218894157 U | 4/2023 |
| CN | 108678097 B | 11/2023 |
| DE | 202016000137 U1 | 2/2016 |
| DE | 102015120283 A1 | 5/2017 |
| DE | 102005040241 B4 | 11/2021 |
| EP | 2701245 A2 | 2/2014 |
| GB | 745978 A | 3/1956 |
| GB | 759590 A | 10/1956 |
| GB | 1120289 A | 7/1968 |
| GB | 2392636 B | 6/2005 |
| JP | 4968711 B2 | 7/2012 |
| KR | 20010069957 A | 7/2001 |
| WO | 2007056631 A2 | 5/2007 |
| WO | 2024035836 A1 | 2/2024 |
| WO | 2024035837 A1 | 2/2024 |

* cited by examiner

SYSTEM AND METHOD FOR ASSEMBLING AND/OR OPERATING CONTROL SWITCH IN RELATION TO WASTE DISPOSER AND IN RELATION TO ALTERNATIVE ELECTRIC POWER SOURCES

FIELD

The present disclosure relates to waste disposers such as food waste disposers and, more particularly, to control or power coupling systems for use in or in conjunction with such waste disposers, as well as to waste disposers comprising such control or power coupling systems, and to methods of assembling and/or operating such waste disposers and/or control or power coupling systems in relation to waste disposers.

BACKGROUND

Food waste disposers are used to comminute food scraps into particles small enough to pass through household drain plumbing. Some food waste disposers have operator-actuatable switching mechanisms in which the operator-actuatable switch is positioned at or near the top of the food waste disposer. Because the operator-actuatable switch is positioned at or near the top of the food waste disposer, a wire cable typically is provided that extends from the operator-actuatable switch to (or substantially to) the bottom of the food waste disposer, at which is located a motor (and possibly related control circuitry such as a start switch).

Although helpful for facilitating an operator's accessing of the switching mechanism, such conventional arrangements of operator-actuatable switching mechanisms are limiting in several respects. In particular, such conventional arrangements are typically highly specialized in that the arrangements are respectively configured to be implemented only in relation to respective types of food waste disposers, such that any given arrangement only can be implemented in regard to a particular food waste disposer model or type.

Further, such conventional arrangements of operator-actuatable switching mechanisms are typically configured for implementation in regard to only a single type of home installation circumstance. It will be appreciated that most newer homes have a standard electrical power outlet (e.g., a wall outlet) near the disposer, to which the disposer can be coupled so as to receive power, but nevertheless most older homes (pre-1970's) have a Romex/BX cable extending from a wall of the home, which can be coupled and terminated directly to the disposer in a hardwired manner. Out of all homes, it is estimated that 60% of homes with a disposer have hardwiring and that the remaining 40% use a power outlet located in the sink cabinet. Notwithstanding these different home installation circumstances, conventional arrangements of operator-actuatable switching mechanisms for food waste disposers are typically configured to be wired in relation to the food waste disposers in a manner that is specifically tailored for implementation of the food waste disposer in relation to only a particular home installation circumstance, such as the circumstance when a Romex/BX cable is present.

For at least one or more of these reasons, or one or more other reasons, it would be advantageous if improved switch mechanisms or systems for use in or in conjunction with food waste disposers or other disposers could be developed, and/or if improved food waste disposers or other disposers having or operating in conjunction with such mechanisms or systems could be developed, and/or if improved methods of assembling and/or operating such mechanisms, systems, or disposers could be developed, so as to address any one or more of the concerns discussed above or to address one or more other concerns or provide one or more benefits.

BRIEF SUMMARY

In at least some example embodiments, the present disclosure relates to a food waste disposer system. The food waste disposer system includes a food waste disposer including a motor, a switch module coupled to the motor and operable to control power to the motor, and a housing including a bottom housing portion and a top housing portion, where the switch module and motor are supported within the housing. Additionally, the food waste disposer system also includes a cover switch mechanism including a cover control switch cord, a primary body having at least one actuator and configured to be coupled to the top housing portion, and a plurality of connecting components. The plurality of connecting components include a terminal cover configured to be coupled to the bottom housing portion and a switch interface connector coupled to the terminal cover and also configured to be coupled to the switch module. Also, the cover control switch cord extends between the primary body and the terminal cover, where a first end of the cover control switch cord extending into the terminal cover includes first and second wire leads, and where the first wire lead is coupled to the switch interface connector. Additionally, the terminal cover is further configured to receive a second end of a power link therewithin, where the switch interface connector is configured to be coupled to at least one third wire lead of the power link, and where the second wire lead is configured to be coupled at least indirectly to a fourth wire lead of the power link.

Further, in at least some further example embodiments, the present disclosure relates to a cover switch mechanism for implementation with a waste disposer having a motor, a switch module coupled at least indirectly to the motor, and a housing including a bottom housing portion and a top housing portion, wherein the switch module and motor are supported within the housing. The cover switch mechanism includes a cover control switch cord, a primary body configured to be coupled to the top housing portion, and a plurality of connecting components. The plurality of connecting components includes a terminal cover configured to be coupled to the bottom housing portion, a switch interface connector coupled to the terminal cover and also configured to be coupled to the switch module, and a wire lead connection component. The cover control switch cord extends between the primary body and the terminal cover, where a first end of the cover control switch cord extending into the terminal cover includes first and second wire leads, and where the first wire lead is coupled to the switch interface connector. Also, the terminal cover is further configured to receive a second end of a power link therewithin, where the switch interface connector is configured to be coupled to at least one third wire lead of the power link, and where the wire lead connection component is configured to couple the second wire lead with a fourth wire lead of the power link.

Additionally, in at least some additional example embodiments, the present disclosure relates to a method of installing a food waste disposer system. The method includes providing the food waste disposer system to an installation environment, where the food waste disposer system includes a housing, a switch module, and a motor, where the switch module and motor are supported at least indirectly upon the housing. Also, the method includes providing a cover switch mechanism including a cover control switch cord, a primary body configured to be coupled to the top housing portion, and a plurality of connecting components, where the plurality of connecting components include a terminal cover configured to be coupled to the bottom housing portion, a switch interface connector, and a wire lead connection component. Further, the method includes causing the cover control switch cord and a power link respectively to extend between a first region exterior of the terminal cover and a second region within the terminal cover by way of first and second orifices, respectively, of the terminal cover, so that each of respective first ends of the cover control switch cord and the power link extends into the second region. Additionally, the method includes coupling respective first wire leads provided at the respective first ends of the cover control switch cord and the power link to respective ports of the switch interface connector, and coupling together, at least indirectly, respective second wire leads provided at the respective first ends of the cover control switch cord and the power link, respectively. Further, the method includes assembling a terminal assembly including the terminal cover, the switch interface connector, and the first ends of the cover control switch cord and the power link in relation to a bottom portion of the housing, where the assembling includes coupling the switch interface connector to the switch module, and connecting the primary body of the cover switch mechanism to a top portion of the housing.

Further, in at least some additional example embodiments, the present disclosure relates to a food waste disposer. The food waste disposer includes a motor, a switch module coupled to the motor and operable to control power to the motor, and a housing including a bottom housing portion and a top housing portion, where the switch module and motor are supported within an interior region within the housing. Each of the bottom housing portion and the switch module are configured to be capable of being coupled, at respectively a first time and a second time, to each of a terminal assembly by which the food waste disposer can receive power from a hardwired power link, and a power cord assembly by which the food waste disposer can receive power from a wall power outlet, respectively. Also, the bottom housing portion includes a surface to which either the terminal assembly or the power cord assembly can be coupled, the surface defining an orifice into which either a first start switch interface connector of the terminal assembly or a second start switch interface connector of the power cord assembly can be inserted so as to be at least partly positioned within the interior of the housing. Further, the start switch includes a plurality of connectors that respectively can be coupled either to a plurality of first complementary formations of the first start switch interface connector when the terminal assembly is coupled to the surface at the first time or to a plurality of second complementary formations of the second start switch interface connector when the power cord assembly is coupled to the surface at the second time.

Additionally, in at least some additional example embodiments, the present disclosure relates to a power cord assembly for implementation in regard to a waste disposer. The power cord assembly includes a plug suitable for being coupled to a wall power outlet, a terminal cover, and a power cord extending between the plug and a first surface of the terminal cover. Also, the power cord assembly includes a start switch interface connector attached to a second surface of the terminal cover, where wires within the power cord are coupled to the start switch interface connector, and where the start switch interface connector, power cord, terminal cover, and plug form an integrated assembly. Also, the terminal cover is configured to be positioned along an exterior surface of a housing of the waste disposer so as to cover an orifice defined with that surface and so that the start switch interface connector extends at least partly into an interior within the housing and can be coupled to a start switch that is positioned within the housing.

Further, in at least some additional example embodiments, the present disclosure relates to a method of implementing a first food waste disposer so as to be coupled to receive electric power. The method includes providing the first food waste disposer including a motor, a switch module coupled to the motor and operable to control power to the motor, and a housing including a bottom housing portion and a top housing portion, where the switch module and motor are supported within an interior region within the housing. Additionally, the method includes, at a first time, coupling a power cord assembly to the first food waste disposer and, at a second time, coupling a terminal assembly to the first food waste disposer. When the power cord assembly is coupled to the switch module, the first food waste disposer can receive power from a wall power outlet and, when the terminal assembly is coupled to the switch module, the first food waste disposer can receive power from a hardwired power link. Further, each of the terminal assembly and the power cord assembly includes each of a respective start switch interface connector coupled to a respective terminal cover. Also, the coupling of the power cord assembly to the first food waste disposer includes first sliding the respective terminal cover of the power cord assembly in a first direction substantially along a surface of the bottom housing so that a plurality of connectors of the switch module are respectively coupled to a first plurality of complementary formations, respectively, of the respective start switch interface connector of the power cord assembly. Additionally, the coupling of the terminal assembly to the first food waste disposer includes second sliding the respective terminal cover of the terminal assembly in the first direction substantially along the surface of the bottom housing so that the plurality of connectors of the switch module are respectively coupled to a second plurality of complementary formations, respectively, of the respective start switch interface connector of the terminal assembly.

BRIEF DESCRIPTION OF THE DRAWINGS

Embodiments of food waste disposer systems (or other waste disposer systems), food waste disposers, and/or systems (or subsystems) employed in or in conjunction with such waste disposer systems/waste disposers, and/or related methods, are disclosed with reference to the accompanying drawings and are for illustrative purposes only. The systems and methods encompassed herein are not limited in their applications to the details of construction, arrangements of components, or other aspects or features illustrated in the drawings, but rather such systems and methods encompassed herein include other embodiments or are capable of being practiced or carried out in other various ways. Like reference numerals are used to indicate like components. In the drawings.

DETAILED DESCRIPTION

Figure 1:
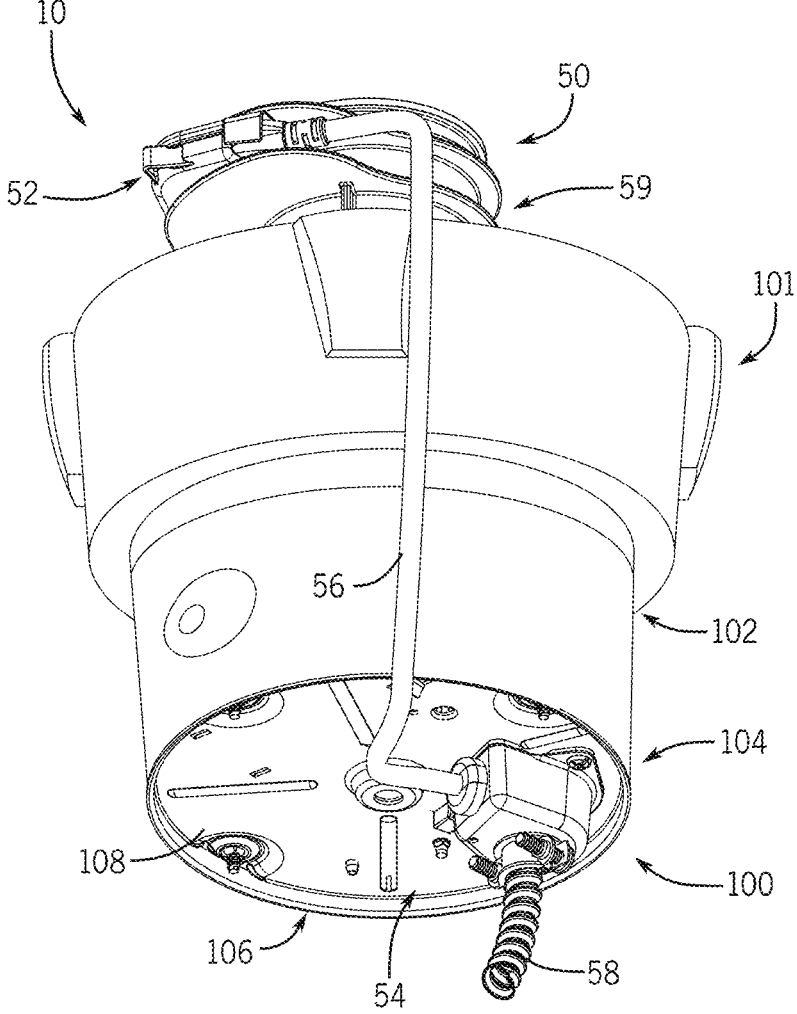
FIG. 1 is a bottom, substantially rear perspective view of a first example food waste disposer assembly including a first example food waste disposer assembled in combination with a first example cover control system, as can be installed in relation to another structure such as a sink, shown to be connected to a Romex/BX cable (shown in cutaway)

The present disclosure relates to and encompasses waste disposer systems and assemblies, such as food waste disposer assemblies, which are configured to be controlled by cover control mechanisms or systems (or subsystems). More particularly, in at least some embodiments, the present disclosure relates to food waste disposer assemblies having food waste disposers and cover control mechanisms, where the food waste disposers include motor sections at bottom ends (or at first ends) of the first waste disposers, and where the cover control mechanisms are mounted atop top ends (or at second ends) of the food waste disposers. Such a cover control mechanism for example can be provided in the form of a cover control kit, by which the cover control mechanism can be easily assembled in relation to a food waste disposer by a consumer. Such a cover control kit can be sold separately from the food waste disposer as a kit, or included along with the disposer (e.g., within the disposer box) when the disposer/disposer assembly is purchased by a consumer.

Additionally, the present disclosure envisions waste disposer assemblies in which the disposer assemblies including the cover control mechanisms can be assembled to receive electric power in any of several manners. More particularly, in at least some embodiments, the present disclosure relates to food waste disposer assemblies in which the food waste disposers, and additionally the cover control mechanism, can be coupled to receive electric power by each (or any) of a power cord that can be plugged into a wall outlet or other power source, or a Romex cable, or a BX hard covered wire. In at least some such embodiments, coupling of the food waste disposer assemblies to a Romex cable or BX hard covered wire can be achieved through implementation of a Romex/Bx connector. Additionally, in at least some embodiments, the present disclosure relates to a cover control mechanism (e.g., in the form of a cover control kit) that may be added to any of a variety of multiple different types of disposers, such that a consumer may pick or select a model of disposer from any of those different types of disposers and then apply/implement the cover control mechanism in relation to that selected disposer. The cover control mechanism is designed to include a connector by which the cover control mechanism may plug into the disposer, for any of the different types of disposers, so as to simplify installation of the cover control mechanism relative to the disposer.

The present disclosure envisions embodiments in which the waste disposer assembly is implemented by either corded installation, in which a cord associated with the waste disposer assembly can be plugged into an electric power (e.g., wall) outlet at the installation site, or hardwired installation, such that electric power can be delivered to the waste disposer assembly via a Romex/BX cable that is present at the installation site. That is, the present disclosure envisions that a given waste disposer assembly can include, or be implemented in conjunction with, a system (or system components) that enables the waste disposer assembly to be installed in either (or both) of two different manners relative to a surrounding environment such as a home installation site so that the given waste disposer assembly can be provided with electric power either by way of an electric power outlet or by way of a Romex/BX cable. Relatedly, the present disclosure envisions methods of installation of waste disposer assemblies according to which a waste disposer assembly can be installed in relation to a surrounding environment in either of two manners depending upon whether the waste disposer assembly is to receive electric power from an electric power outlet or via a Romex/BX cable.

Further, in at least some embodiments encompassed herein, the present disclosure relates to a disposer assembly having a lower end frame (LEF) and start switch, and a cover control mechanism, which are configured to facilitate coupling of the cover control mechanism to the disposer as well as to a power source by way of any of a power cord or Romex or BX cord or cable. In some such embodiments, the disposer assembly includes an arrangement by which the leads from a trigger switch (e.g., of the cover control mechanism) may be coupled to the start switch connector and also to the power cord leads, all within the same general area. Further, in some such embodiments, all of the wires are routed and connected into a new connector that mates with the start switch, as part of the LEF assembly.

More particularly, in at least some such embodiments encompassed herein, the disposer assembly is arranged in a manner according to which the two main cords—that is, the cord or cable with the leads from the cover control mechanism and also the cord or cable intended to link the disposer assembly with a power source (e.g., a Romex cable, BX hard covered cable, or power cord suited for being plugged into a wall outlet)—come into a junction box at different angles so the two cords can have individual strain reliefs. A new (two conductor) connector makes it possible to join the power leads within this small junction box. The junction box and new connector can be considered to be part of the cover control mechanism rather than the disposer, and this new cover control mechanism (or cover control kit) design resolves the interface to the new LEF and start switch and frees the customer from only having only one disposer model choice.

Figure 2:
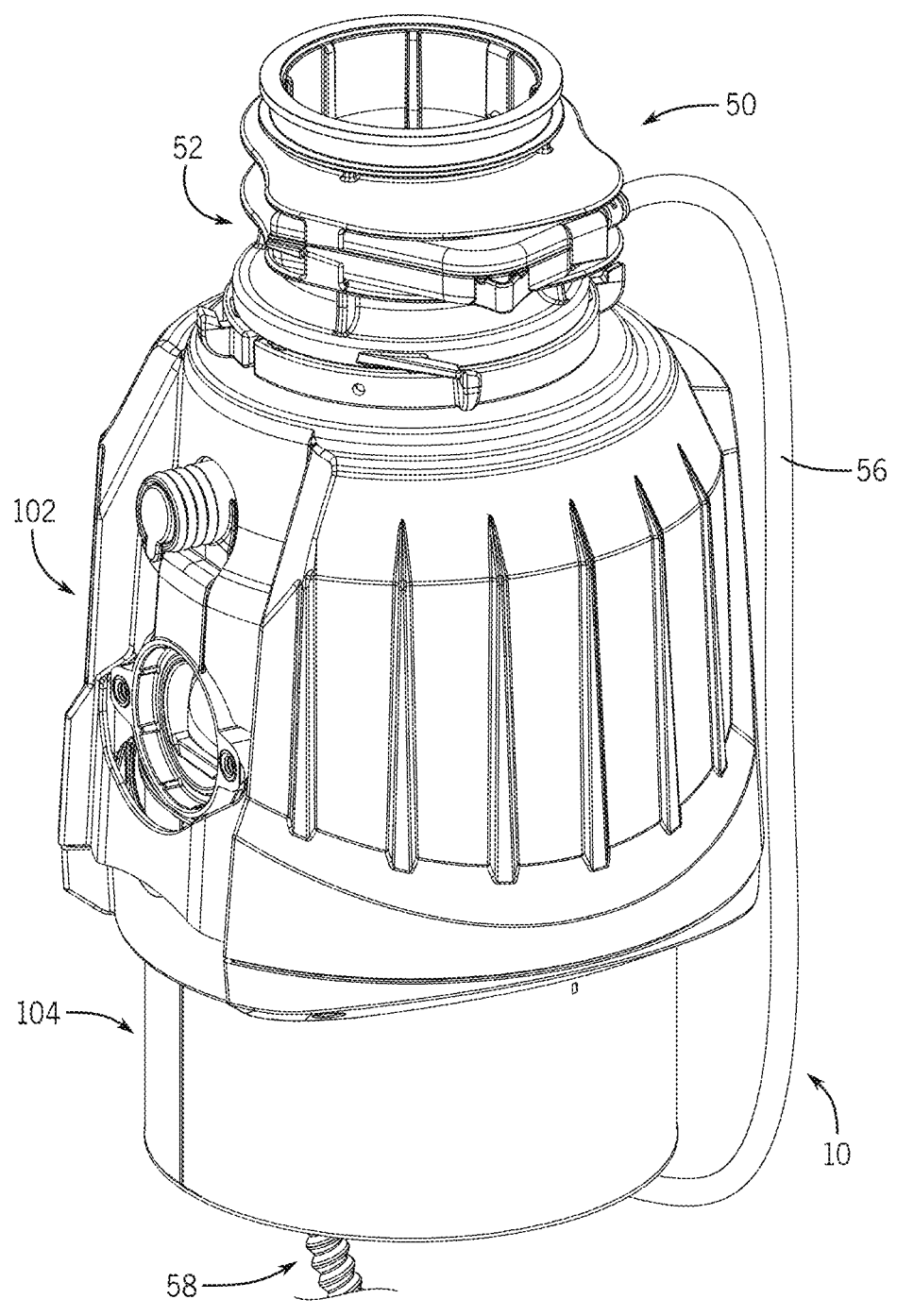
FIG. 2 is a top, substantially front perspective view of the first example food waste disposer assembly of FIG. 1, again shown to be connected to the Romex/BX cable (shown in cutaway)

Referring to FIGS. 1 and 2, a bottom, substantially rear perspective view and a top, substantially front perspective view, respectively, of a food waste disposer system or assembly 10 are shown, in accordance with a first example embodiment encompassed herein. As illustrated, the food waste disposer assembly 10 includes a food waste disposer 100 having an enclosure 102, a cylindrical stator band 104, and a lower end frame (LEF) 106 (see FIG. 1). In general, the food waste disposer 100 can be understood as including a food conveying section, a motor section, and a grinding section. The food conveying section is generally positioned at a location corresponding to the location of the enclosure 102, at or near the top of the food waste disposer 100. The motor section is generally positioned at a location corresponding to and within the stator band 104, at or near the bottom of the food waste disposer 100. The grinding section is disposed between the food conveying section and the motor section. It should be appreciated that the food conveying section includes an inlet for receiving food waste and fluid (e.g., water), and conveys the food waste to the grinding section. The motor section includes a motor imparting rotational movement to a motor shaft to operate the grinding section. In the present example embodiment, the motor can be an electric motor that is an inductive motor, although the present disclosure is intended to encompass embodiments of food waste disposers employing other types of motors such as permanent magnet motors.

In the present example embodiment, the food waste disposer assembly 10 also includes, in addition to the food waste disposer 100, a control switch mechanism 50. The control switch mechanism 50 is configured to allow for users to turn on, turn off, or otherwise actuate or control operation of the disposer in relation to which the control switch mechanism is implemented. In the present example, the control switch mechanism 50 is considered to be distinct from the food waste disposer 100, with the food waste disposer and control switch mechanism both being included as part of the food waste disposer assembly 10. However, in other embodiments or contexts, the control switch mechanism 50 can instead be considered to form a part of the food waste disposer 100 itself. The control switch mechanism 50 can be included with the food waste disposer 100 at the time of purchase of that food waste disposer 100 (or of the overall food waste disposer assembly 10), or can be obtained or purchased separately from the food waste disposer, as a cover control kit.

As shown, in the present embodiment, the control switch mechanism 50 includes a primary body 52, LEF connecting components 54 (see FIG. 1), and a cover control switch cord (or cable or wire) 56 linking the primary body 52 with the LEF connecting components 54. The primary body 52 is configured to be mounted atop or at the top end of the food waste disposer 100, along the cover of the food waste disposer. Due to this arrangement of the primary body 52, actuation switches (or other actuators) of the control switch mechanism 50 provided in the primary body are more easily accessed by users/operators, and the control switch mechanism 50 can also be referred to as a cover control mechanism. The cover control switch cord 56 is connected to the primary body 52 of the control switch mechanism 50 arranged at the top end of the food waste disposer 100 (e.g., to an AV extension tube 59 at the top of the disposer), and is arranged to run downward from the primary body 52 along the outside of the food waste disposer and then to pass under the food waste disposer to the LEF connecting components 54. Arranged in this manner, the cover control switch cord 56 not only allows for the LEF connecting components 54 to be coupled to the primary body 52, but also allows for the LEF connecting components to be positioned along the LEF 106.

As will be described in further detail below, the positioning of the LEF connecting components 54 along the LEF 106 both facilitates coupling of the actuation switches (or other actuators) of the primary body 52 of the control switch mechanism 50 to the motor section by way of the cover control switch cord 56, and also facilitates the coupling of those actuation switches and the motor section with a power source. In the present example embodiment shown in FIGS. 1 and 2, the LEF connecting components 54 are shown to be coupled to a Romex/BX cable 58, by which power is received from a power source. The Romex/BX cable 58 is intended to be representative of either a Romex cable or a BX hard covered wire, as can be preinstalled in some homes or facilities for delivery of power to a device such as the food waste disposer assembly 10. For purposes of the present description, the Romex/BX cable 58 is not considered to be a part of the food waste disposer assembly 10 although, in other contexts, the Romex/BX cable (or a portion of it, such as the portion nearby or coupled to the LEF connecting components 54) can be considered to be a part of the food waste disposer assembly.

Although the example embodiment of FIGS. 1 and 2 illustrates the LEF connecting components 54 as being coupled to the Romex/BX cable 58, the present embodiment also is one that can accommodate implementation of a power cord having a plug that plugs into a wall outlet (e.g., a NEMA 5-15 plug), as will be additionally described below. That is to say, in the present embodiment, the LEF connecting components 54, and the food waste disposer assembly 10 overall, are configured to allow for either implementations in which a Romex/BX cable 58 is coupled to the LEF connecting components 54 to allow for the supplying of power to the food waste disposer assembly, or implementations in which a power cord 400 (see FIG. 22) is implemented in regard to the LEF connecting components 54 such that, upon the power cord also being plugged into a wall outlet, power can be supplied to the food waste disposer assembly 10. Again, for purposes of the present description, such a power cord (e.g., the power cord 400) is not considered to be a part of the food waste disposer assembly although, in other contexts, the power cord (or a portion of it, such as the portion nearby or coupled to the LEF connecting components 54) can be considered to be a part of the food waste disposer assembly.

Figure 3:
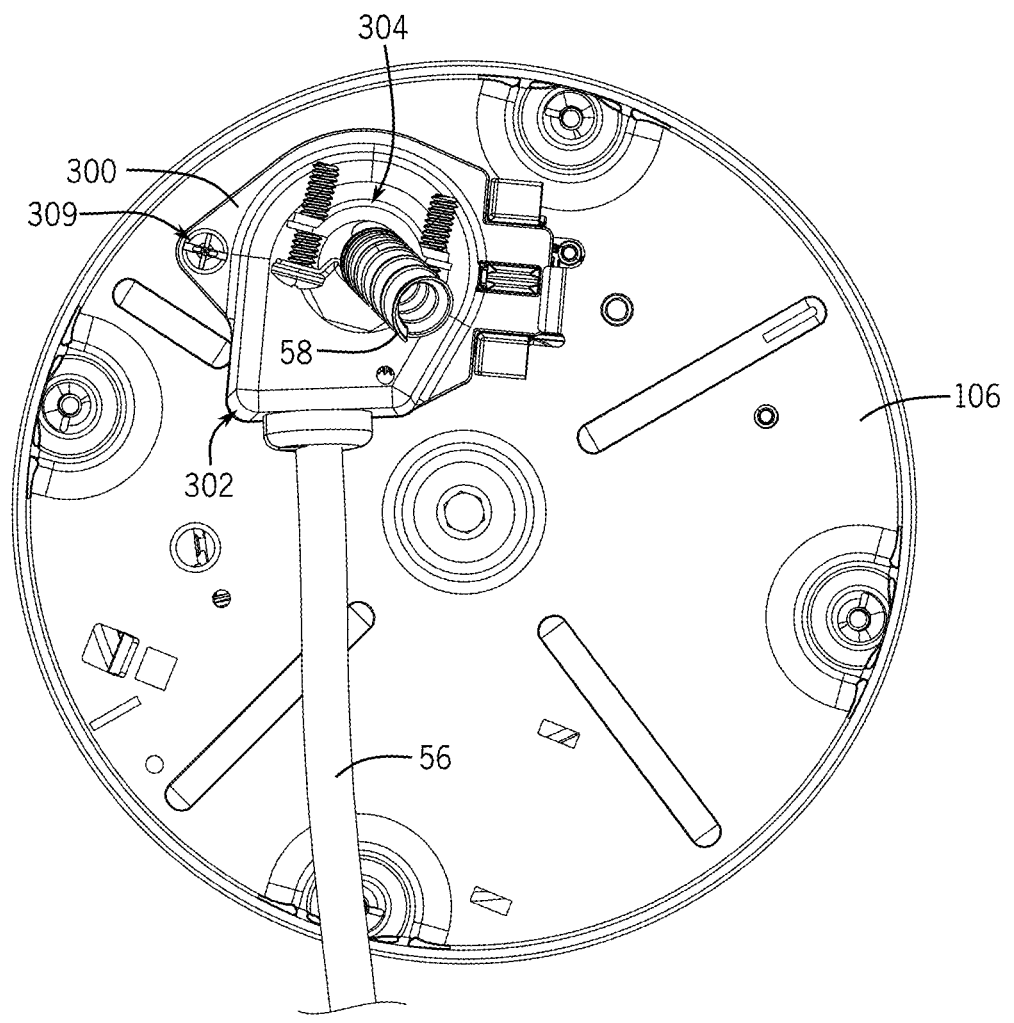
FIG. 3 is a bottom perspective view of the first example food waste disposer assembly and Romex/BX cable of FIGS. 1 and 2, with each of a cover control switch cord of the assembly and the Romex/BX cable shown in cutaway.
Figure 4:
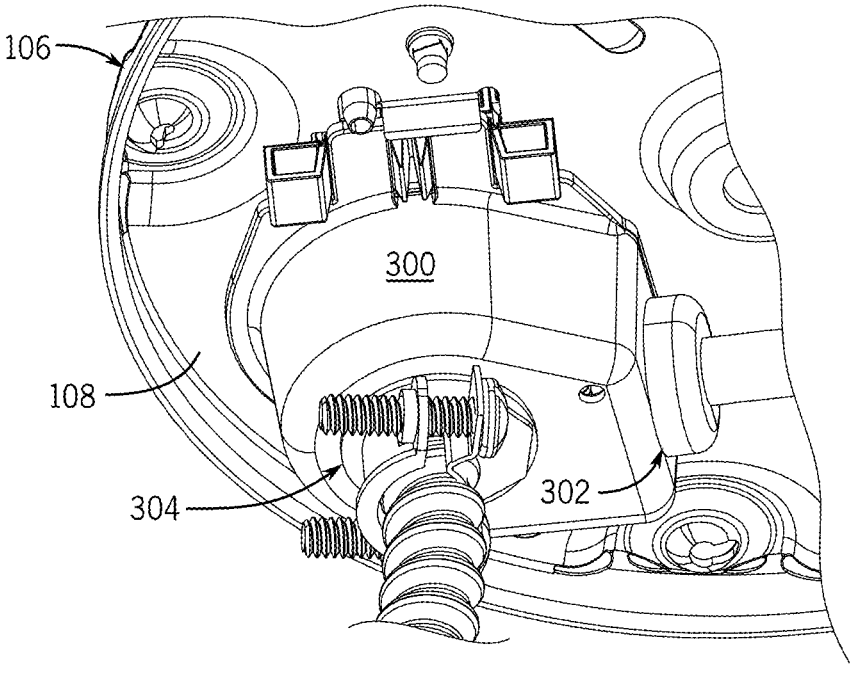
FIG. 4 is a first cutaway, enlarged bottom perspective view of portions of the first example food waste disposer assembly of FIGS. 1, 2, and 3.
Figure 5:
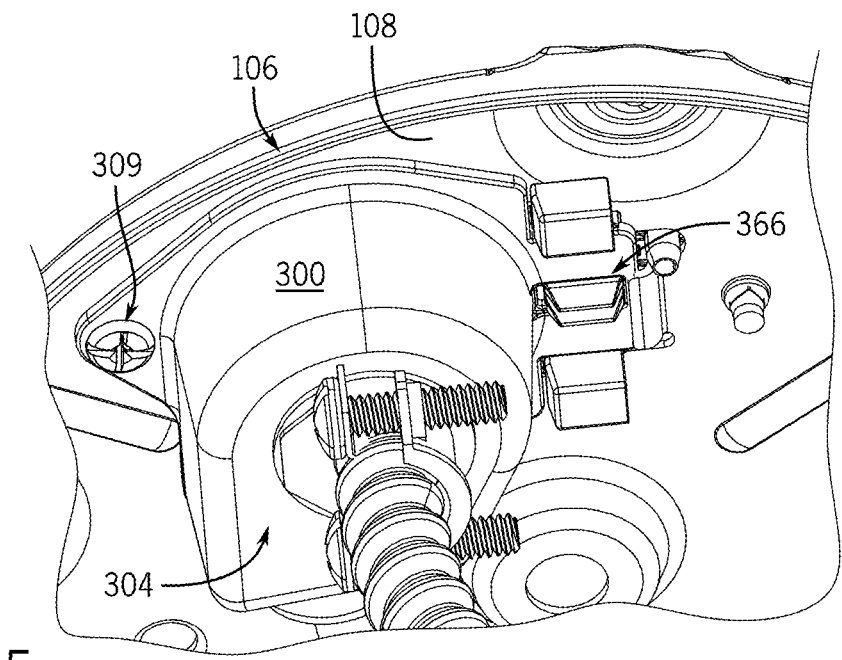
FIG. 5 is a second cutaway, enlarged bottom perspective view of portions of the first example food waste disposer assembly of FIGS. 1, 2, 3, and 4.

Turning to FIG. 3, FIG. 4, and FIG. 5, first, second, and third bottom perspective views are provided of the food waste disposer assembly 10 or portions thereof, to more fully illustrate how a terminal cover (or junction box) 300 of the LEF connecting components 54 receives the cover control switch cord 56 as well as the Romex/BX cable 58. More particularly, FIG. 3 is a bottom perspective view of the food waste disposer assembly 10 of FIGS. 1 and 2, with each of the cover control switch cord 56 and the Romex/BX cable 58 shown in cutaway. By comparison, FIG. 4 is a first cutaway, enlarged bottom perspective view of portions of the food waste disposer assembly 10, and FIG. 5 is a second cutaway, enlarged bottom perspective view of portions of the food waste disposer assembly 10. FIGS. 3, 4, and 5 particularly show that the terminal cover 300 of the LEF connecting components 54 is coupled along a bottom surface 108 of the LEF 106 and is configured so that the cover control switch cord 56 enters the terminal cover at a first side wall 302 but the Romex/BX cable 58 enters the terminal cover at a bottom wall 304. The bottom wall 304 is substantially parallel to the bottom surface 108 of the LEF 106, and so the Romex/BX cable 58 enters the terminal cover 300 in a direction that is substantially normal (or perpendicular) to the bottom surface 108 of the LEF. By comparison, the cover control switch cord 56 enters the terminal cover 300 in a direction that is substantially parallel to or along the bottom surface 108 of the LEF 106.

Figure 6:
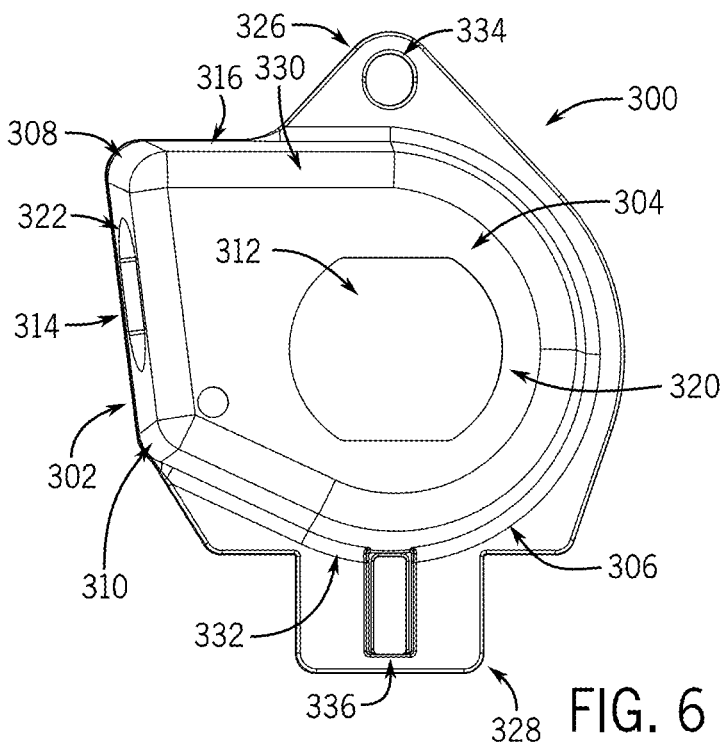
FIG. 6 is a bottom plan view of a terminal cover of the first example food waste disposer assembly of FIGS. 1, 2, 3, 4, and 5.
Figure 7:
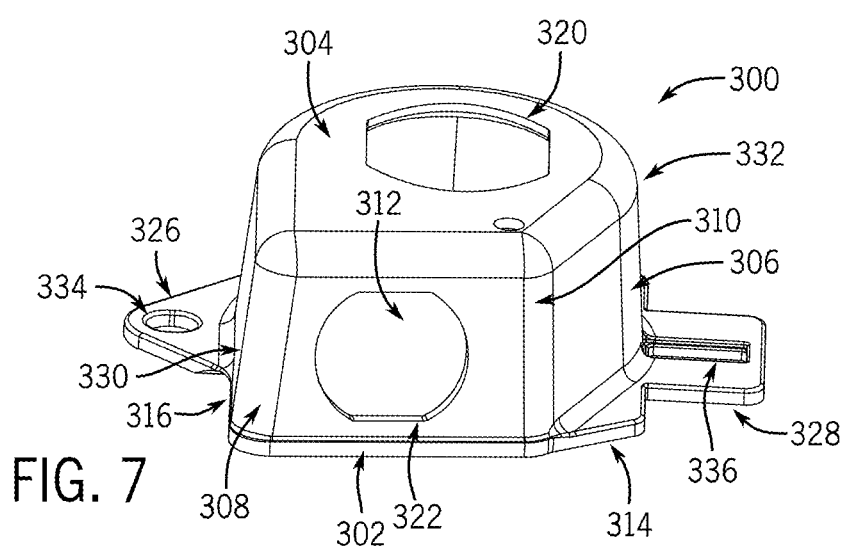
FIG. 7 is a bottom perspective view of the terminal cover of FIG. 6.

More particularly with respect to the terminal cover 300, FIG. 6 provides a bottom plan view of the terminal cover and FIG. 7 provides a bottom perspective view of the terminal cover. As shown, the terminal cover (or junction box) 300 takes the form of a cup that includes, in addition to the bottom wall 304, the first side wall 302 that extends upward from the bottom wall (downward when viewed as shown in FIG. 7) to a first rim portion 314, and an additional curved side wall 306 that also extends upward from the bottom wall to a second rim portion 316. The bottom wall 304 includes a bottom orifice 320 that is configured to receive the Romex/BX cable 58 and the first side wall 302 includes a side orifice 322 that is configured to receive the cover control switch cord 56. The additional curved side wall 306 extends around the bottom wall 304 from a first upwardly-extending edge 308 of the first side wall 302 to a second upwardly-extending edge 310 of the first side wall, such that the bottom wall 304, first side wall 302, and additional curved side wall 306 together define the cup in terms of defining an interior space 312 (see also FIG. 8). The interior space 312 is entirely enclosed except for the bottom orifice 320, the side orifice 322, and a top opening 324 defined by the first rim portion 314 and the second rim portion 316.

In addition, the terminal cover 300 includes a first rim extension (or lip) 326 and a second rim extension (or lip) 328, each of which extends outward from the second rim portion 316 parallel or substantially parallel to the bottom wall 304 and can be considered to form a part of second rim portion. More particularly, the first rim extension 326 is a substantially triangular formation that extends generally outward away from a first side portion 330 of the additional curved side wall 306 that is adjacent to the first upwardly-extending edge 308. Also, the second rim extension 328 is a substantially rectangular formation that extends generally outward away from a second side portion 332 of the additional curved side wall 306 that is adjacent to the second upwardly-extending edge 310. The first rim extension 326 includes a round orifice 334 therein and the second rim extension 328 includes an elongated slot 336 that also extends generally outward away from the second side portion 332.

In the present embodiment, the terminal cover 300 is made as a zinc casting. The use of a zinc casting can be desirable in terms of making it easier to achieve the complex shape of the terminal cover 300 that is suitable for the desired manner of wire routing. In other embodiments, the terminal cover 300 can be made from other materials such as steel, or in other manners.

Figure 8:
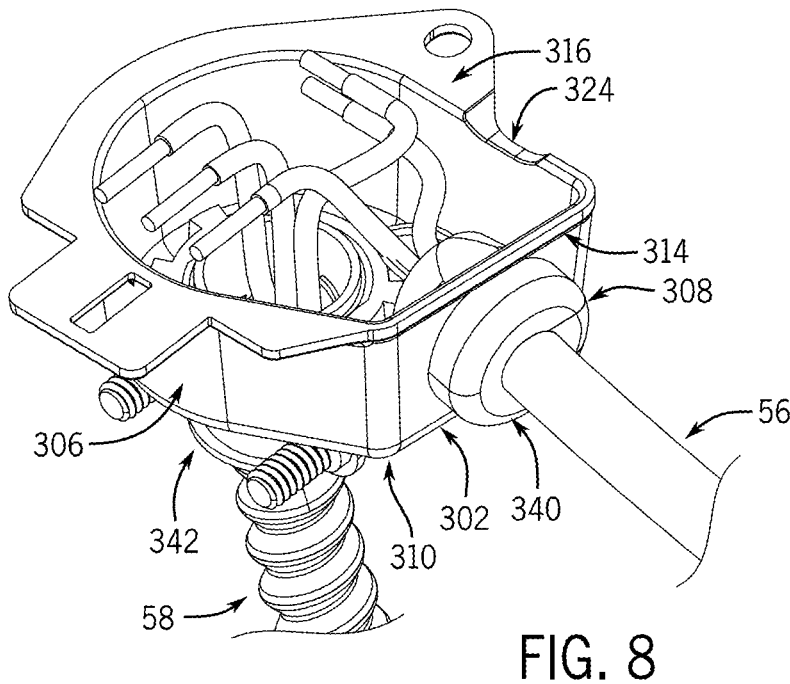
FIG. 8 is a top perspective view of several LEF connecting components, including the terminal cover of FIGS. 6 and 7, of the food waste disposer assembly of FIGS. 1 and 2, assembled in combination with a cover control switch cord (shown in cutaway) of the food waste disposer assembly and the Romex/BX cable (shown in cutaway) of FIGS. 1 and 2.
Figure 9:
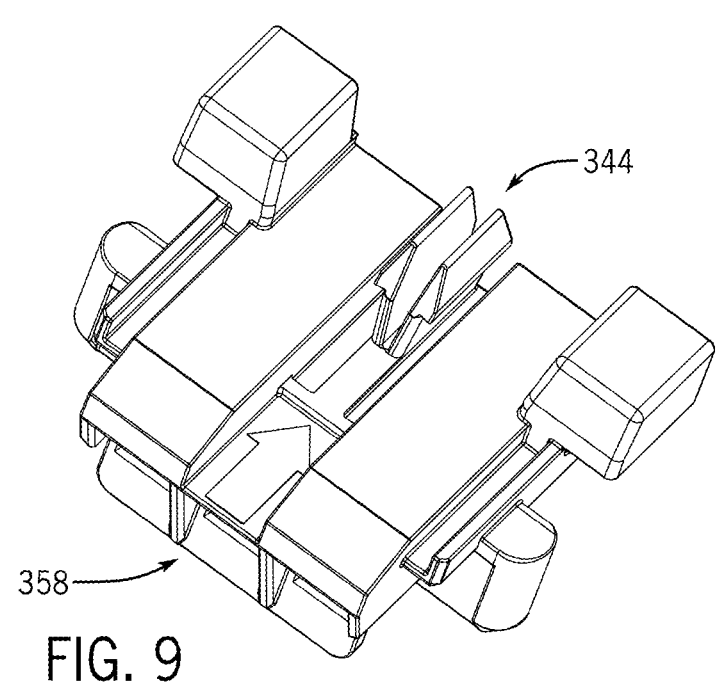
FIG. 9 is a perspective view of a start switch interface connector of the food waste disposer assembly of FIGS. 1 and 2.

Turning to FIG. 8, the LEF connecting components 54 in the present embodiment include not only the terminal cover 300 but also a strain relief component (or grommet) 340, an additional strain relief component (or simply strain relief) 342, and a start switch interface connector 344 (see FIG. 9). Also, as will be described further below, the LEF connecting components 54 in the present embodiment additionally include a wire joiner or wire joiner connector 346 (see FIG. 13), although in another embodiment a wire nut 348 is employed in place of the wire joiner connector. The cover control switch cord 56 can be affixed to the terminal cover 300 by way of the strain relief component 340, and the Romex/BX cable 58 can be secured in relation to the terminal cover 300 by way of the strain relief 342. The strain relief 342 (which can also be referred to as a power link coupler, or a Romex/BX coupler) in the present embodiment can take the form of a commonly available electrical component typically used to ground metallic sheathed cable (BX) and/or secure the Romex/BX cable to another component such as, for example, an electrical outlet box or an adapter (in alternate embodiments, the strain relief can take other forms, such as a grommet).

Further, the LEF connecting components 54 are configured to facilitate the coupling of first and second wire leads 350 and 352, respectively, of the cover control switch cord 56, and third, fourth, and fifth wire leads 354, 356, and 357, respectively (the white/neutral, green/ground, and black/live leads, respectively), of the Romex/BX cable 58, with one another and with the start switch interface connector 344 as described in further detail below with respect to FIGS. 9 through 20. Additionally, the start switch interface connector 344 is configured to be coupled to a start switch 388 (see FIG. 16) of the food waste disposer 100 as also described in further detail below.

Turning to FIGS. 9-20, additional perspective views are shown of the food waste disposer assembly 10 and portions thereof, particularly to illustrate a method of assembly or installation of the food waste disposer assembly in relation to the Romex/BX cable 58, in accordance with an example embodiment encompassed herein. The method can be performed by any of a variety of operators or users, such as a customer who purchased the food waste disposer 100, or a professional technician or installer. In particular, the method represented by FIGS. 9-20 in the present embodiment is one in which the control switch mechanism 50, as can be provided in the form of a cover control kit (or as can be provided along with the food waste disposer 100 when purchase), is assembled in relation to the food waste disposer 100. Also, in the method represented by FIGS. 9-20, the Romex/BX cable 58 is coupled to the control switch mechanism 50 and to the food waste disposer 100. By way of the method, the food waste disposer assembly 10 is coupled to a power source by way of the Romex/BX cable 58 and also is configured to allow operator control of the food waste disposer by the control switch mechanism 50. Although the method as shown by FIGS. 9-20 entails coupling of the food waste disposer assembly 10 to a power source by way of the Romex/BX cable 58, the present disclosure also encompasses additional methods that entail coupling the food waste disposer assembly to a power source by way of a power cord, as discussed further below.

In the present embodiment, the method of FIGS. 9-20 begins at a first step represented by FIG. 9, which shows a perspective view of the start switch interface connector 344. In the first step represented by FIG. 9, an operator strips (e.g., by way of a wire stripping tool) each of the third and fourth wire leads 354 and 356 (e.g., white and green wires) of the Romex/BX cable 58 and the first wire lead 350 (or alternatively the second wire lead 352) of the cover control switch cord 56. In the present embodiment, each of these wire leads 354, 356, and 350 (or 352) is stripped to a push in terminal distance. As illustrated in FIG. 9, the start switch interface connector 344 includes a wire stripping feature 358 that shows the extent to which each of the third, fourth, and first wire leads 354, 356, and 350 (or the second lead 352) should be stripped.

Figure 10:
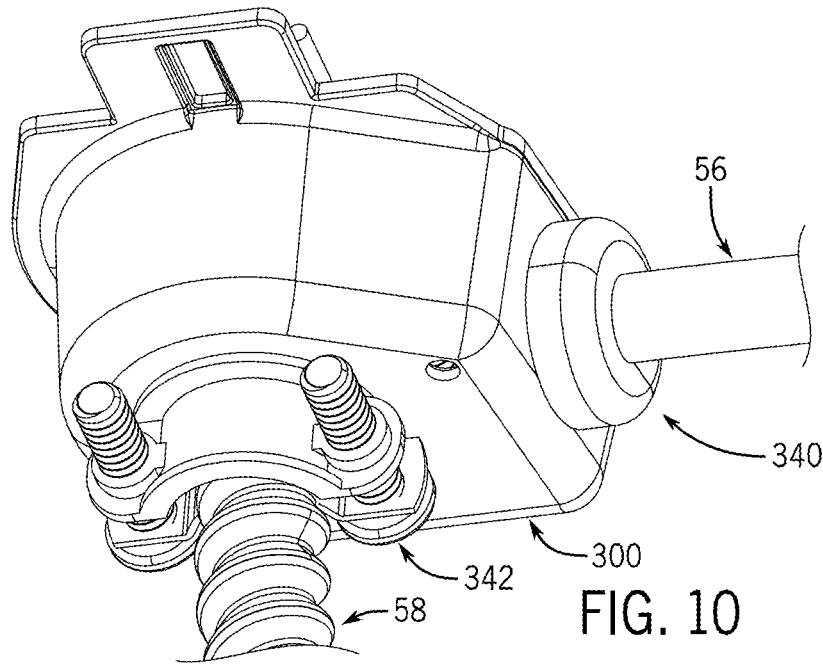
FIGS. 10, 11, 12, 13, 14, 15, 16, 19, and 20 respectively are perspective cutaway views of portions of the food waste disposer assembly of FIGS. 1 through 8 that, together with FIGS. 9, 17, and 18, are intended to illustrate, collectively, steps of a method of assembly or installation of the food waste disposer assembly of FIGS. 1 and 2.

Next, at a second step represented by FIG. 10, the operator inserts and secures, relative to the terminal cover 300, each of the cover control switch cord 56 and the Romex/BX cable 58. More particularly, in this second step, the operator inserts the strain relief component (or grommet) 340 into the side orifice 322 of the terminal cover 300 and additionally inserts the cover control switch cord 56 (the end opposite the end coupled to the primary body 52) including the first and second wire leads 350 and 352 through the side orifice 322 and through the strain relief component therewithin, from the exterior of the terminal cover 300 into the interior space 312 of the terminal cover. Additionally, the operator inserts the strain relief 342 into (or in relation to) the bottom orifice 320 of the terminal cover 300 and additionally inserts the Romex/BX cable 58 (the free end opposite the end coupled to any power source) including the third, fourth, and fifth wire leads 354, 356, and 357 through the bottom orifice 320 and through the strain relief (or grommet) 342, from the exterior of the terminal cover 300 into the interior space 312 of the terminal cover. Upon completion of this second step, each of the cover control switch cord 56 and the Romex/BX cable 58 are coupled to and secured relative to the terminal cover 300, in a manner such that each of the first, second, third, fourth, and fifth wire leads 350, 352, 354, 356 and 357 are positioned in the interior space 312, as shown in FIG. 8.

Figure 11:
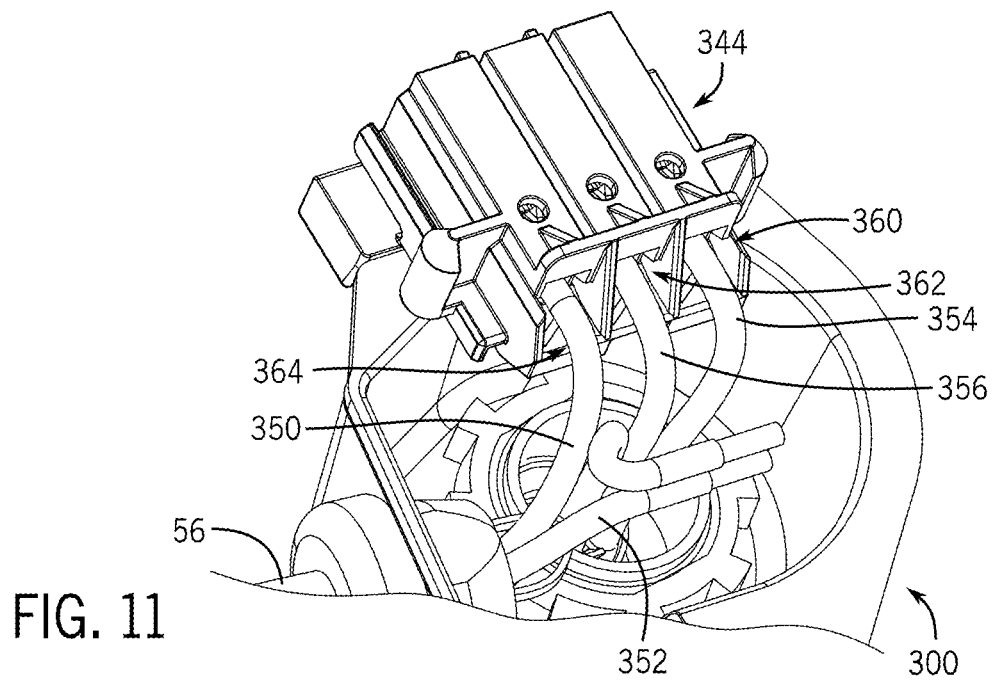
Figure 12:
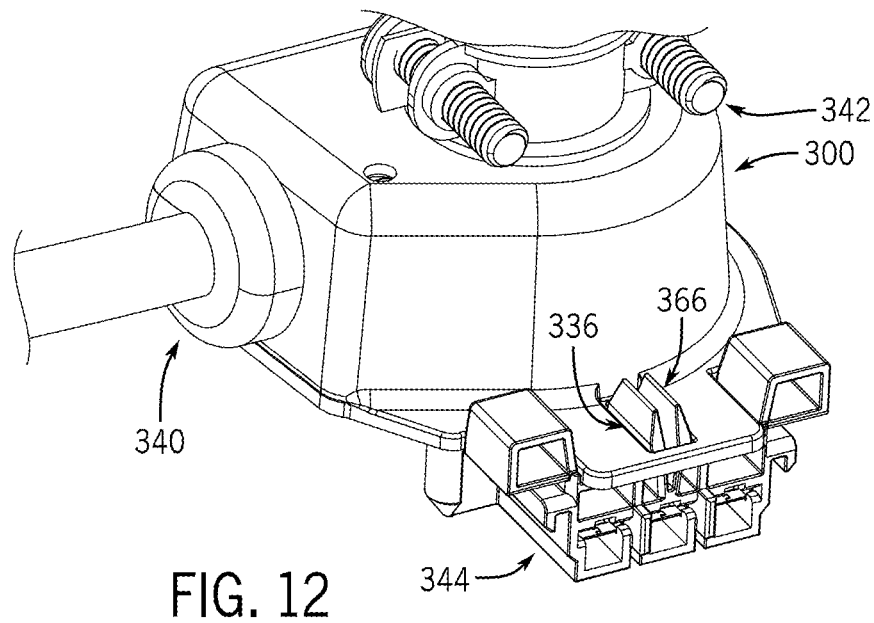

Next, at a third step represented by FIG. 11, the operator assembles/couples the start switch interface connector 344 with respect to each of the cover control switch cord 56 and the Romex/BX cable 58. To achieve this coupling, the operator pushes in the third and fourth wire leads 354 and 356 of the Romex/BX cable 58 (which were stripped in the first step) into first and second input ports 360 and 362, respectively, of the start switch interface connector 344. Additionally, the operator pushes the first wire lead 350 (or alternatively the second wire lead 352, depending upon whether the first or second wire lead was stripped in the first step) into a third input port 364 of the start switch interface connector 344. Further, at a fourth step represented by FIG. 12, the operator snaps the start switch interface connector 344 into the terminal cover 300 so as to be secured relative to the terminal cover. This snapping of the start switch interface connector 344 in relation to the terminal cover 300 in the present embodiment is achieved by positioning pronged deformable snapping features 366 of the start switch interface connector (see also FIG. 9) into and at least partly through the elongated slot 336 until the snapping features snap into place behind the elongated slot as shown in FIG. 12. FIG. 12 particularly illustrates the combination of the start switch interface connector 344 and the terminal cover 300 when assembled in this manner, and with the snapping features 366 jutting out of the elongated slot 336 after having been pushed therethrough.

Figure 13:
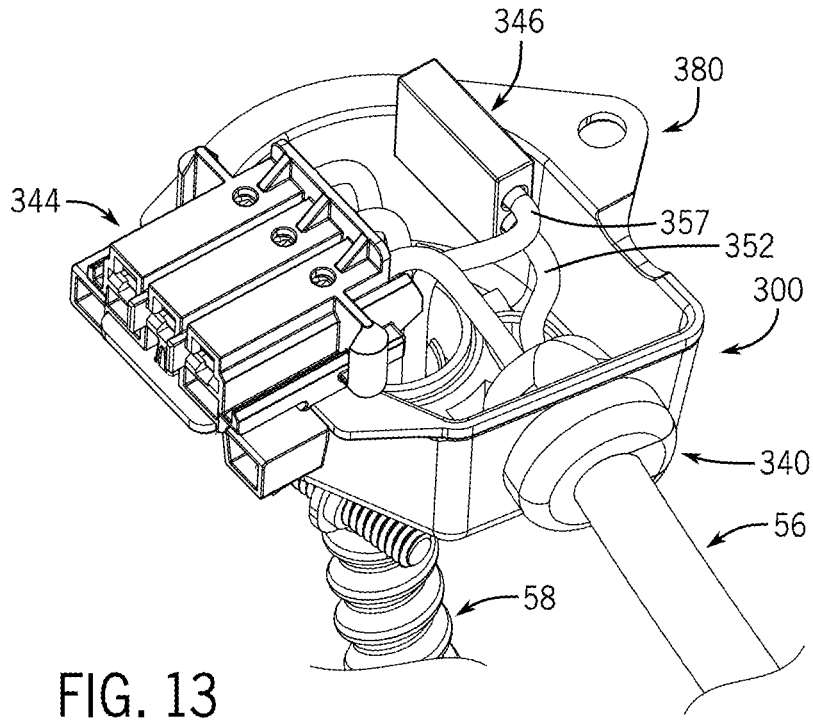

Next, at a fifth step shown in FIG. 13, the operator couples the second wire lead 352 of the cover control switch cord 56 to the fifth (e.g., black) wire lead 357 of the Romex/BX cable 58, by way of the wire joiner connector 346. Upon joining the second and fifth wire leads 352 and 357, an overall terminal assembly 380 including the terminal cover 300, the start switch interface connector 344, the strain relief component 340, the power link coupler 342, and the wire leads 350, 352, 354, 356, and 357 and associated ends of the cover control switch cord 56 and the Romex/BX cable 58, is ready to be installed or coupled in relation to the food waste disposer 100 and particularly the LEF 106. For purposes of the present description, it will be appreciated that the terminal assembly 380 both includes components that are considered parts of the food waste disposer assembly 10, such as the LEF connecting components 54 including the terminal cover 300, and also includes components that are (at least as described above) not considered to be part of the food waste disposer assembly 10, namely, the third, fourth, and fifth wire leads 354, 356, and 357 of the Romex/BX cable 58. Nevertheless, in other contexts, the terminal assembly can be understood to include all of the components of the terminal assembly 380 except for any portions of the Romex/BX cable 58 such as the wire leads 354, 356, and 357.

Figure 14:
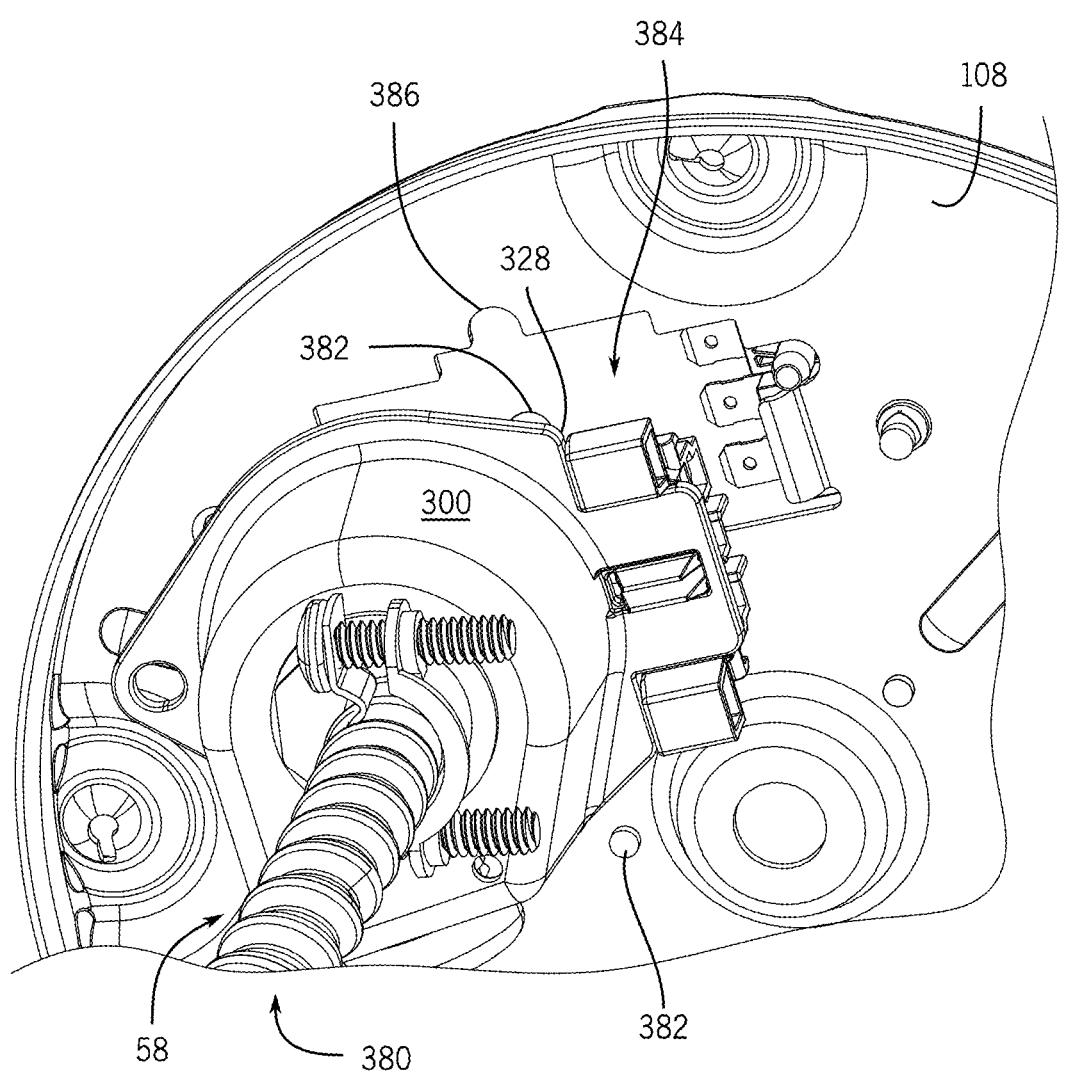
Figure 15:
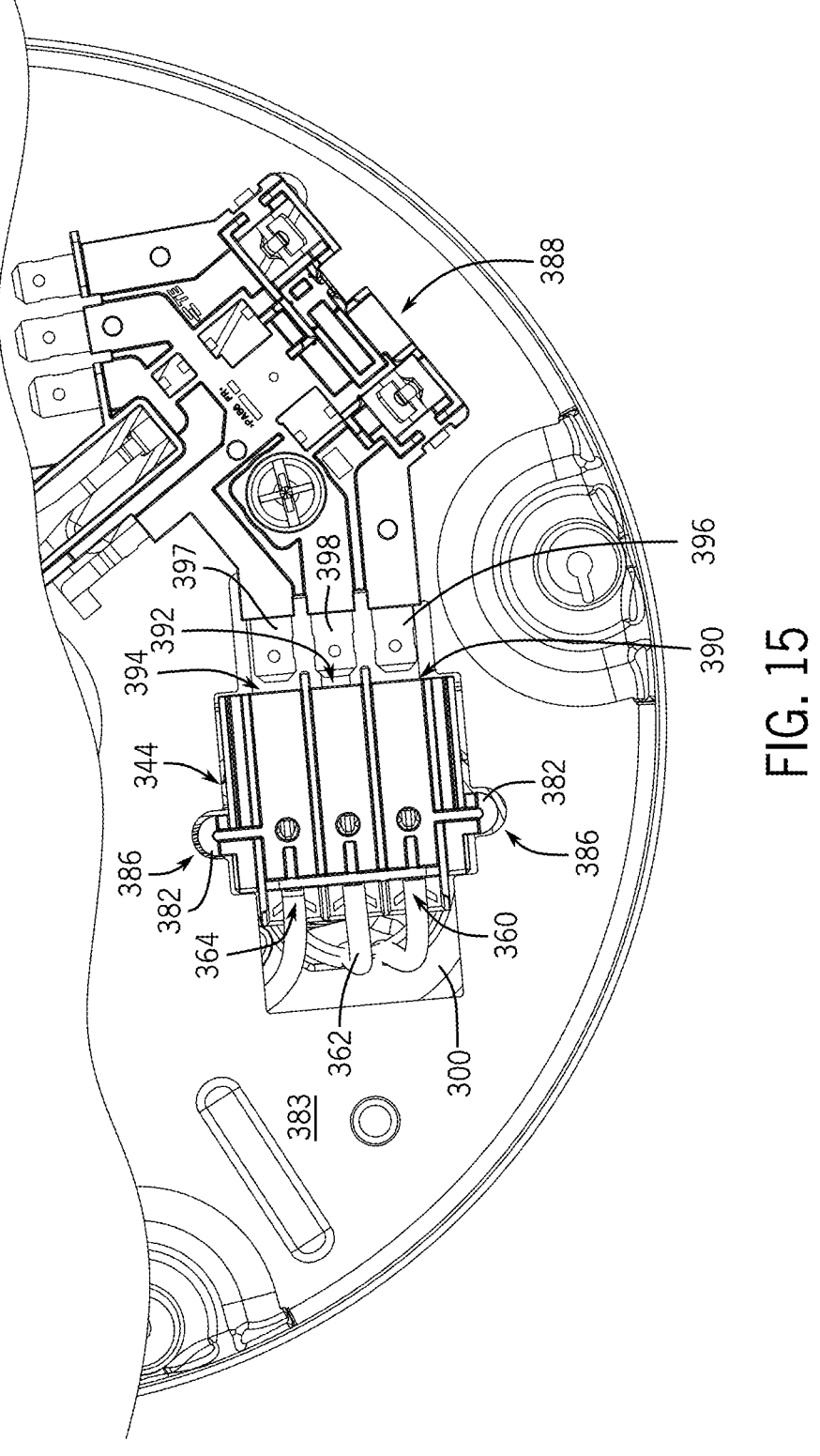

Installation/assembly of the terminal assembly 380 in relation to the LEF 106 generally involves three steps. At a sixth step represented by FIGS. 14 and 15, the terminal assembly 380 is aligned and fitted into the LEF 106. More particularly in this regard, FIG. 14 provides a bottom perspective view of portions of the LEF 106 in relation to the terminal assembly 380, as the terminal assembly is approaching the bottom surface 108 of the LEF 106. As illustrated, the start switch interface connector 344 includes first and second keying tabs (or protrusions) 382 arranged on opposite sides of that start switch interface connector, generally above opposite sides of the second rim extension 328. The LEF 106 includes a generally-rectangular LEF opening (or orifice) 384 that includes first and second keying recesses 386 (see also FIG. 15) that respectively are complementary in shape to the first and second keying tabs 382, such that the start switch interface connector is keyed to the LEF opening. The LEF opening 384 including the keying recesses 386 is shaped and sized so that, as the terminal assembly 380 reaches the bottom surface 108 of the LEF 106, the start switch interface connector 344 is able to proceed into the food waste disposer 100 and be positioned above an inner (top or inwardly-facing) surface 383 of the LEF, as shown in FIG. 15, which provides a top plan view of portions of that inner surface and the terminal assembly 380. Although the start switch interface connector 344 is positioned above the inner surface 383 of the LEF 106 when the terminal assembly 380 is aligned and fitted into the LEF 106, it should further be appreciated from FIGS. 14 and 15 that the terminal cover 300 remains positioned entirely below the bottom surface 108 of the LEF 106, with the first and second rim extensions 326 and 328 being positioned so as to abut and interface that bottom surface.

Figure 16:
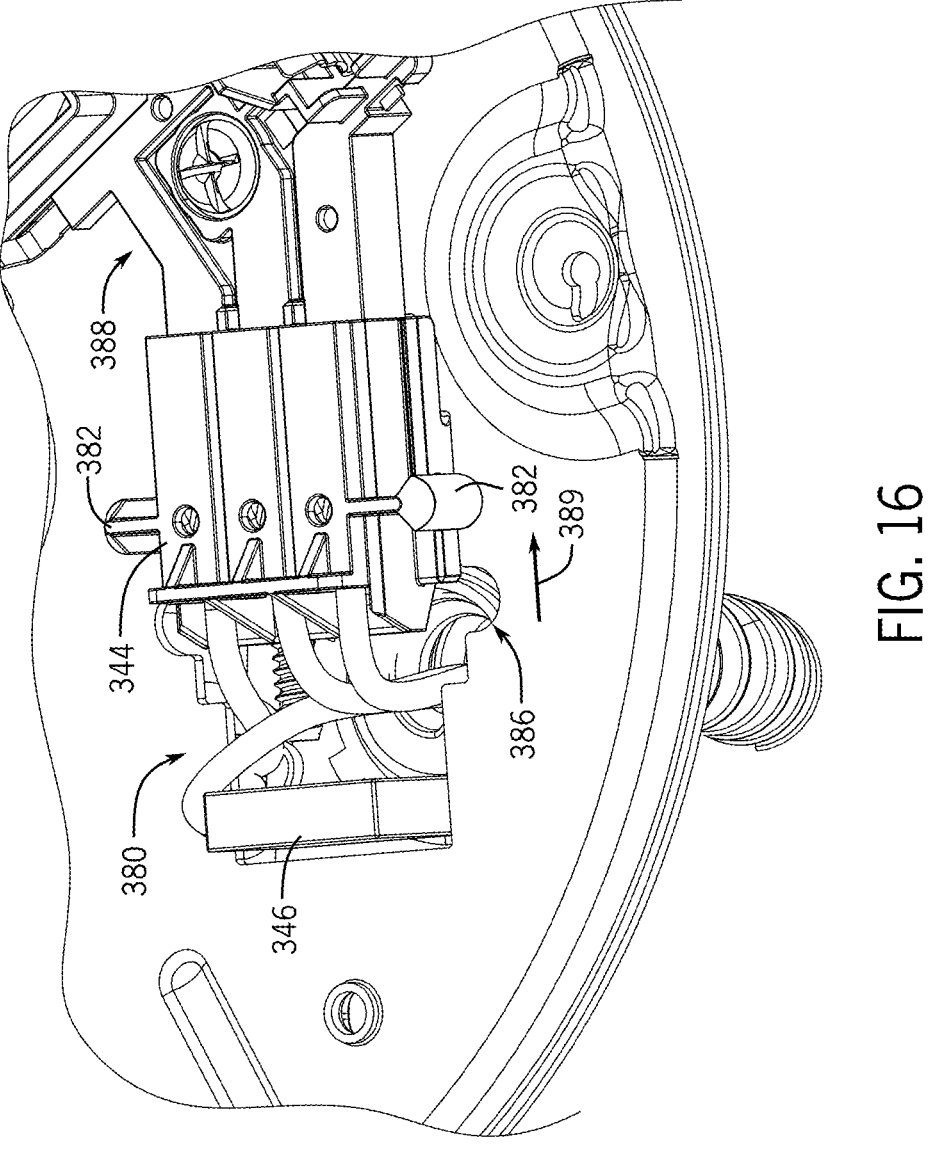

Additionally, subsequent to the sixth step, at a seventh step represented by FIG. 16 the terminal assembly 380 is slid relative to the LEF 106 so that the start switch interface connector 344 is pushed ahead tight against a start switch 388 that is mounted and supported upon the inner surface 383 of the LEF 106. It will be appreciated also from FIG. 15 that the start switch interface connector 344 includes first, second, and third output ports 390, 392, and 394, respectively, that are opposed to (and coupled electrically to) the first, second, and third input ports 360, 362, and 364, respectively, and additionally that the start switch 388 includes first, second, and third input tabs 396, 398, and 397, respectively. Further there is a gap (not shown) at least between certain portions of the start switch interface connector 344 such as the keying tabs 382 and certain portions of the terminal cover 300 such as the first and second rim extensions 326 and 328. Given this arrangement, it is possible for a user/installer to cause the terminal assembly 380, and particularly the start switch interface connector 344, to slide in a direction indicated by an arrow 389 shown in FIG. 16 relative to the LEF 106 until (as shown in FIG. 16) the respective first, second, and third input tabs 396, 398, and 397 are positioned within, and electrically coupled to, the respective first, second, and third output ports 390, 392, and 394, respectively.

Figure 17:
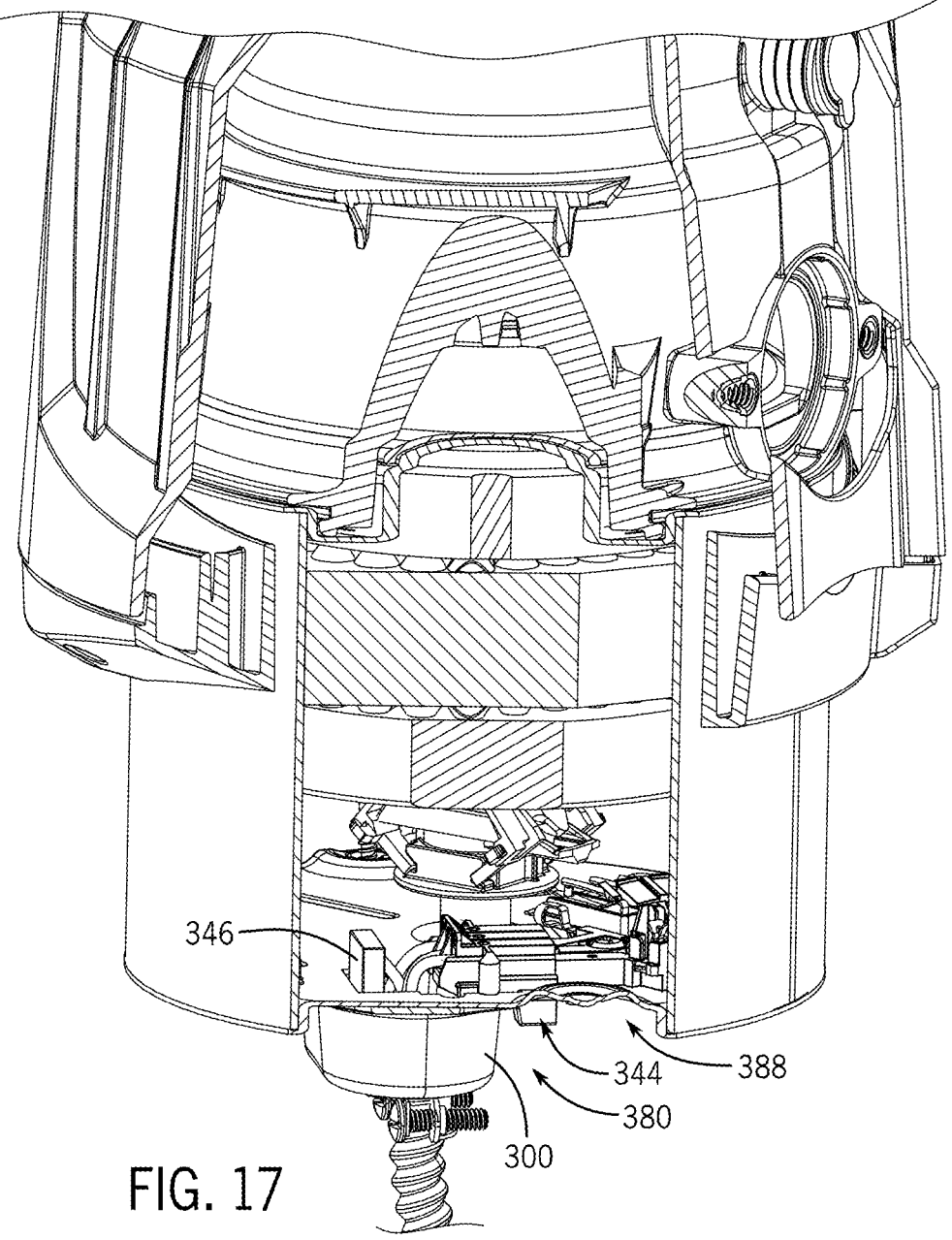
FIGS. 17 and 18 provide two additional cutaway views of the food waste disposer assembly of FIGS. 1 and 2 that further illustrate portions of that assembly after a step of the method of assembly/installation represented by FIG. 16 has been completed.
Figure 18:
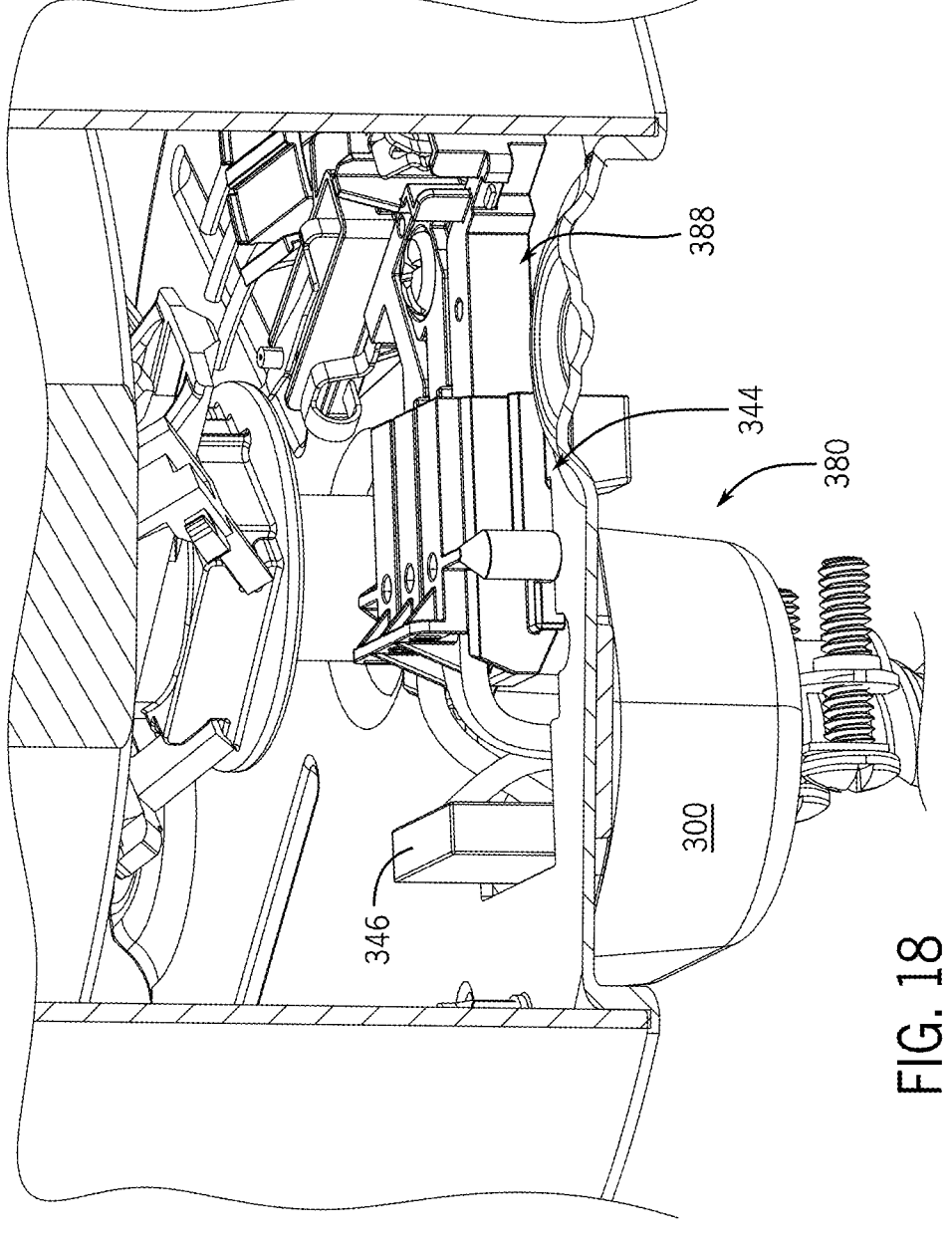

Given such installation, it will be appreciated that the first, second, and third input tabs 396, 398, and 397 of the start switch 388 are electrically coupled to the third, fourth, and first wire leads 354, 356, and 350, respectively. FIGS. 17 and 18 respectively show first and second side perspective, cutaway views of the food waste disposer 100 and terminal assembly 380 when the terminal assembly has been slid relative to the LEF 106 so that the start switch interface connector 344 is coupled to the start switch 388. Further, when such installation has been completed, it should be recognized that a switchable electrical circuit is completed among each of the Romex/BX cable 58, the control switch mechanism 50, and the start switch 388 (and associated motor of the food waste disposer). In particular, this electrical circuit can be understood to extend from the fifth wire lead (e.g., the black, live power lead) 357 of the Romex/BX cable 58 to the second wire lead 352 of cover control switch cord 56 coupled thereto by way of the wire joiner connector 346. Further, this electrical circuit can be understood to extend additionally through the control switch mechanism 50, from the second wire lead 352 via the cover control switch cord 56 to actuation switch(es) within the primary body 52, and back to the first wire lead 350 via the cover control switch cord. Additionally, this electrical circuit can be understood to extend further to the motor via the start switch 388 and the start switch interface connector 344, insofar as the first wire lead 350 is coupled to the start switch interface connector that is in turn connected to the motor via the switch module (depending upon switching status of the switch module). Further, the electrical circuit is completed, at least in terms of the circuit being coupled back to the Romex/BX cable 58, insofar as the motor is coupled to one or both of the third wire lead 354 and the fourth wire lead 356 of the Romex/BX cable again by way of the start switch 388 and start switch interface connector 344.

Figure 19:
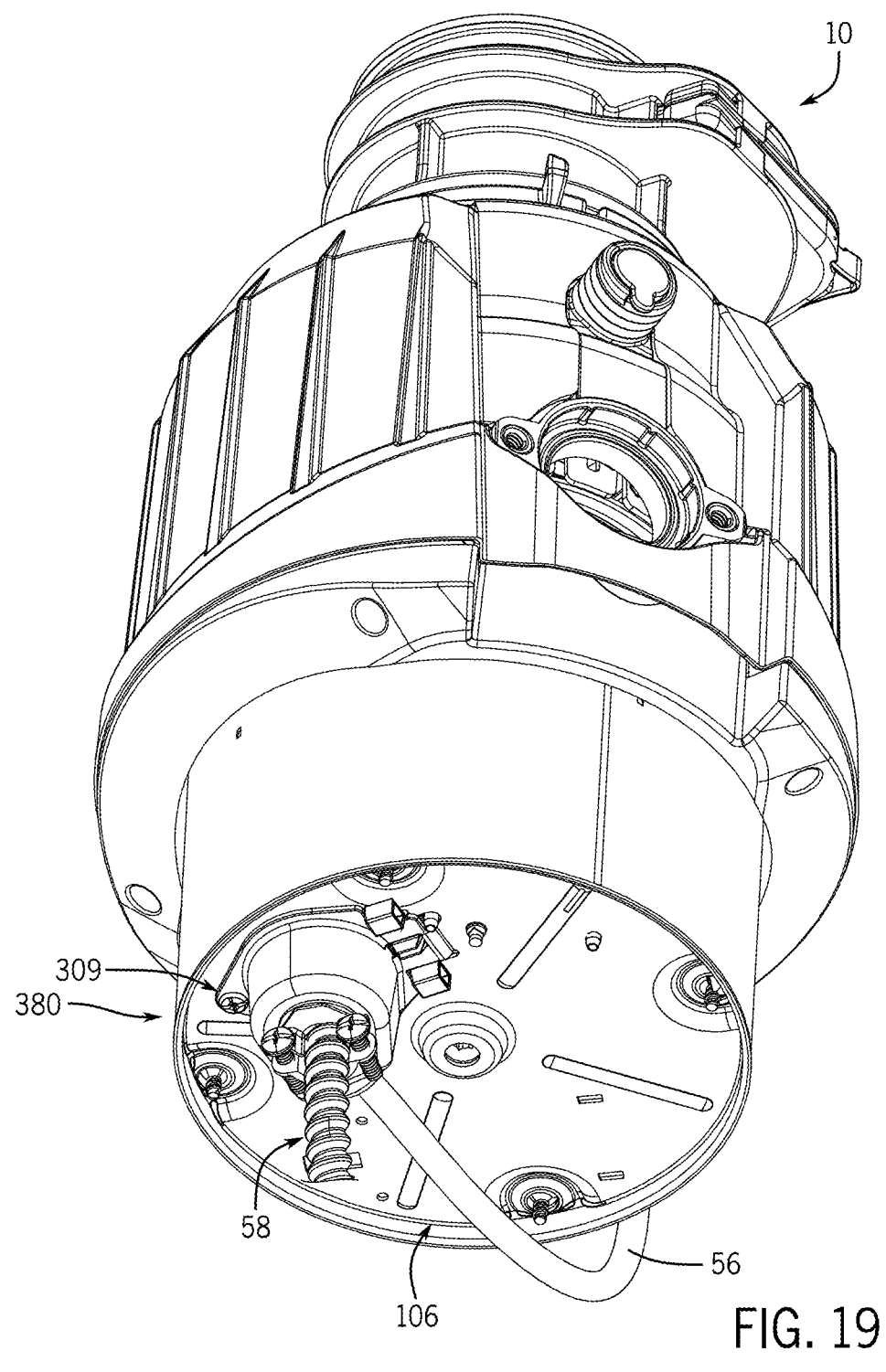

Upon completion of the seventh step, an eighth step in the installation process is performed in which the terminal assembly 380 is secured to the food waste disposer 100 and particularly to the LEF 106, as shown in FIG. 19. In the present example embodiment, the terminal assembly 380 is secured to the food waste disposer 100 by way of screwing-in a fixing screw 309 through the round orifice 334 in the terminal cover 300 and then subsequently into a receiving orifice (not shown) that is provided in the LEF 106, when the terminal assembly 380 has been slid into position (so that the start switch interface connector 344 is engaged with the start switch 388) as described in regard to FIGS. 16, 17, and 18). By screwing-in the fixing screw 309, the terminal assembly 380 is locked into position relative to the LEF 106. In particular, when locked in this position, the terminal assembly 380 cannot slide away from and disengage from the start switch 388. Further, when locked in this position, the keying tabs 382 are not aligned with the keying recesses 386, and thus the terminal assembly 380 is retained against the LEF 106 insofar as the start switch interface connector 344 is in contact with the inner surface 383 and cannot pass through the LEF 106 out of the food waste disposer 100. That is, by virtue of the keying tabs (or LEF tabs) 382 being positioned along the inner surface 383 of the LEF 106 at locations where there are none of the keying recesses 386, the terminal assembly 380 (and particularly the front of the terminal assembly, that is, the portion closest to the start switch 388) also is secured relative to the LEF.

It should be appreciated that, depending upon the embodiment, the fixing screw 309 can be considered a part of the food waste disposer 100 (and/or the LEF 106 thereof) or alternatively can be considered one of the LEF connecting components 54 (and/or part of the terminal assembly 380). In embodiments in which the fixing screw 309 is included as part of the food waste disposer 100 (e.g., as originally purchased), the above-described method should be understood to include a preliminary step of removing the fixing screw 309 from the LEF 106 prior to the installation of the terminal assembly 380 with respect to the LEF 106 (e.g., prior to the sixth step of FIGS. 14 and 15 as described above). Alternatively, if the fixing screw 309 is considered to be one of the LEF connecting components 54, then no preliminary step of removing the fixing screw from the LEF needs to be performed.

Figure 20:
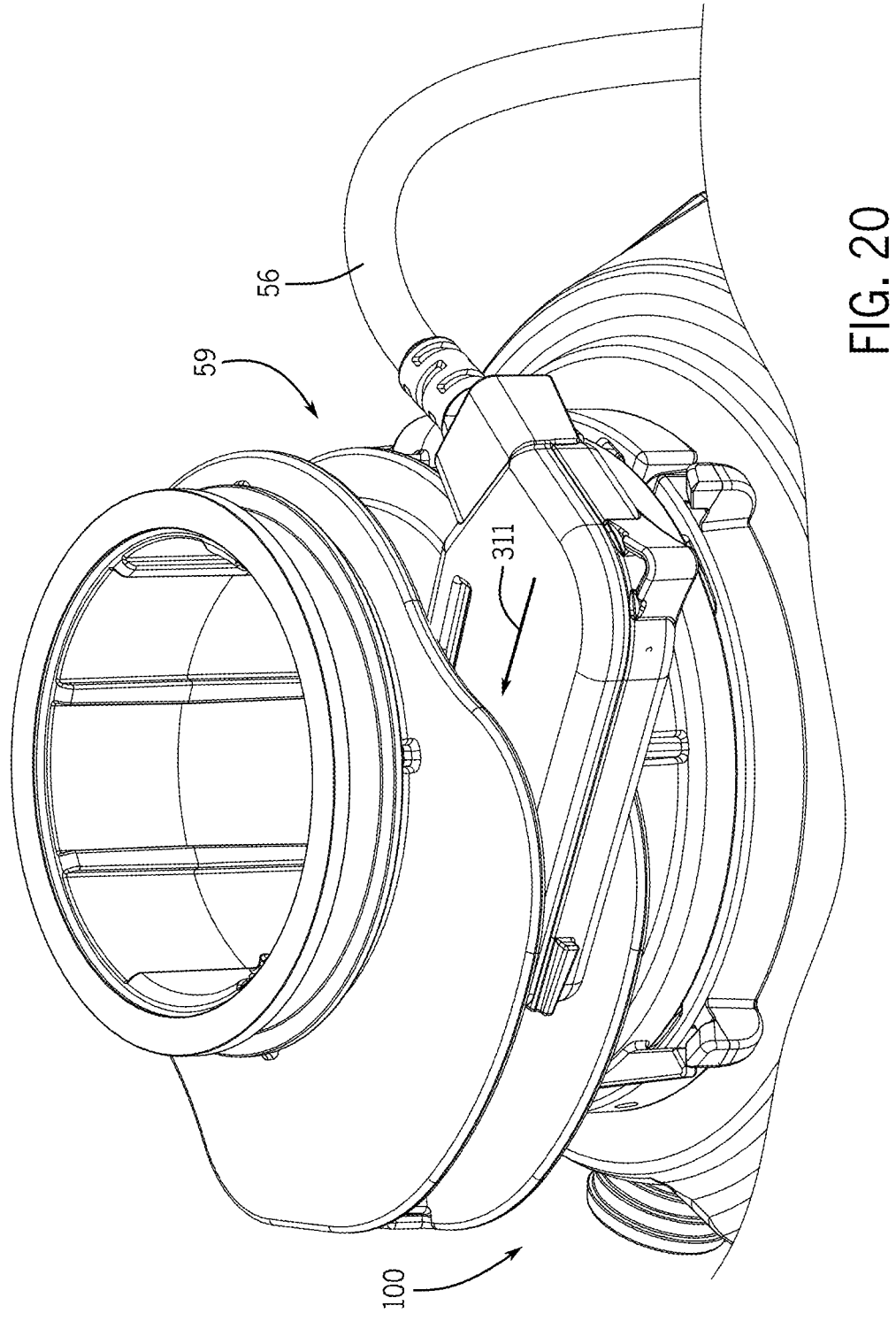

Finally, after the terminal assembly 380 is secured to the LEF 106 by way of installation of the fixing screw 309, a ninth step is performed as illustrated by FIG. 20. In this ninth step, the primary body 52 of the control switch mechanism 50 (e.g., the cover control switch) is attached in place with respect to the AV extension tube 59 at the top of the food waste disposer 100. In the present embodiment, the primary body 52 can be snapped in place by moving the primary body 52 relative to the AV extension tube 59 in a direction as indicated by an arrow 311.

Figure 21:
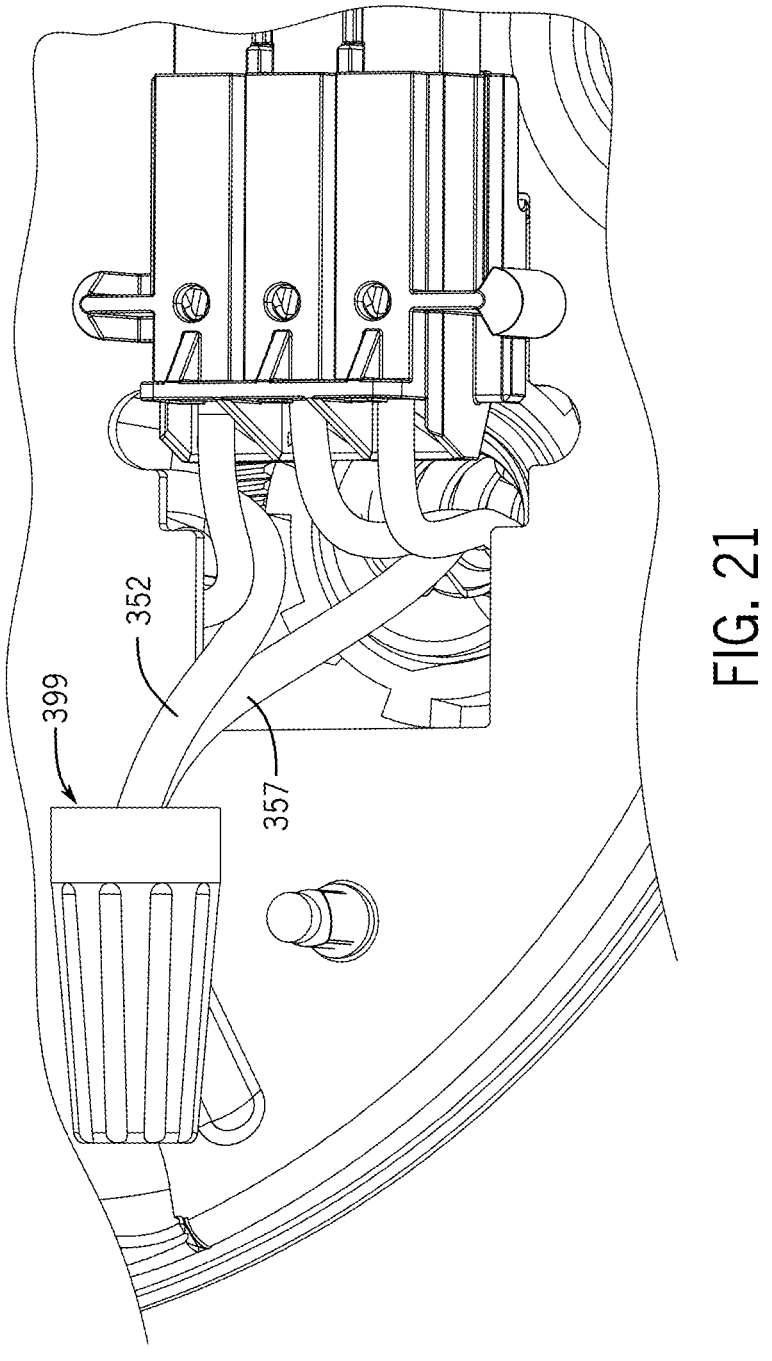
FIG. 21 is a perspective view of an alternate embodiment of a terminal assembly in which a wire nut is employed to couple wire leads in place of a wire joiner connector.

The present disclosure is intended to encompass numerous other embodiments and arrangements in addition to those described above with respect to FIGS. 1-20. For example, although the above-described embodiment envisions that the LEF connecting components 54 include the wire joiner connector 346, in an alternate embodiment the LEF connecting components can instead include a wire nut 399. For such an embodiment employing a wire nut, the fifth step (previously described with respect to FIG. 13) can take an alternative form in which the operator couples the second wire lead 352 of the cover control switch cord 56 to the fifth (e.g., black) wire lead 357 of the Romex/BX cable 58 by way of the wire nut 399, as shown in FIG. 21.

Additionally, as already noted above, the present disclosure relates to food waste disposer assemblies in which the food waste disposers, and additionally the cover control mechanisms, can be coupled to receive electric power by a power cord that can be plugged into a wall outlet or other power source, rather than coupled to receive electric power by way of the Romex/BX cable 58. More particularly, although FIGS. 1 through 21 envision the food waste disposer assembly 10 as having the LEF connecting components 54 coupled to the Romex/BX cable 58, the present disclosure also envisions embodiments of food waste disposer assemblies in which the LEF connecting components 54 are coupled to the power cord 400 (see FIG. 22) that plugs into a wall outlet (not shown).

Further, it should be appreciated that the process described above with reference to FIGS. 9 through 20 can be performed not only to assemble the food waste disposer assembly 10 in relation to the Romex/BX cable 58, but also to assemble the food waste disposer assembly in relation to the power cord 400. That is, the process is identical except insofar as the steps involving coupling of the Romex/BX cable 58 in relation to the LEF connecting components 54 are modified to be steps involving coupling of the power cord 400 in relation to those LEF connecting components. In this regard, it should be appreciated that, in the modified version of the first step represented by FIG. 9, an operator strips (e.g., by way of a wire stripping tool) each of the third and fourth wire leads of the power cord 400 in addition to the first wire lead 350 (or alternatively the second wire lead 352) of the cover control switch cord 56.

Figure 22:
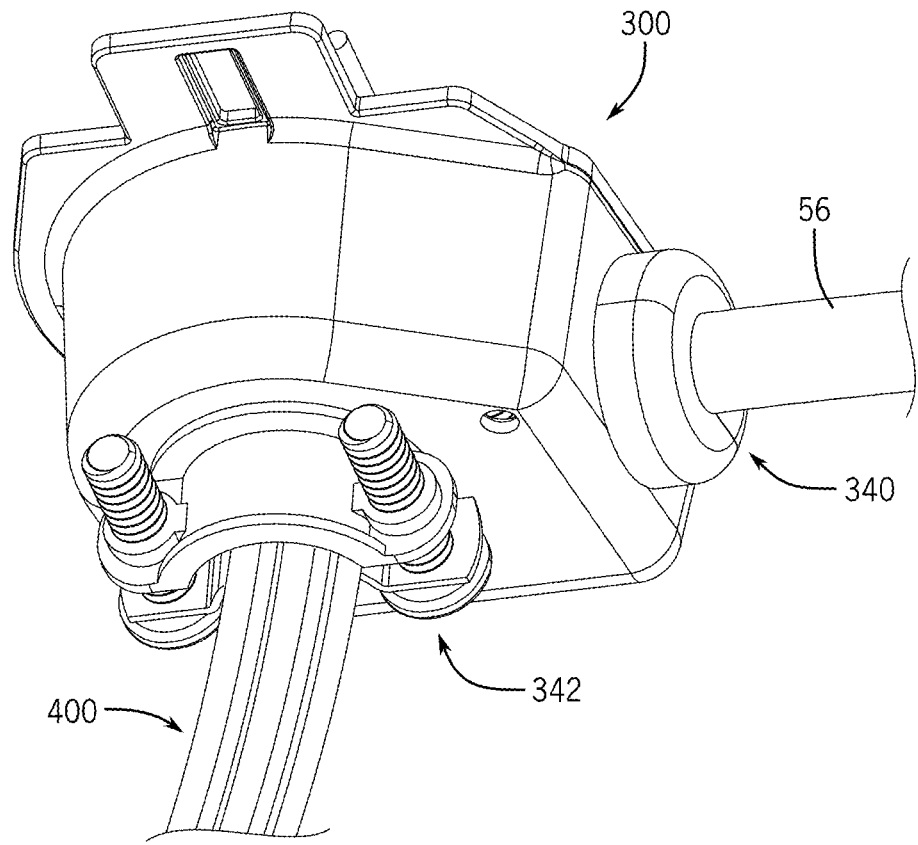
FIG. 22 is a perspective view of portions of the food waste disposer assembly of FIGS. 1 through 8 substantially corresponding to the portions shown in FIG. 10, when the food waste disposer assembly is being assembled in accordance with a method of assembly/installation so as to be coupled to a power cord rather than the Romex/BX cable.

FIG. 22 particularly illustrates a modified version of the second step of FIG. 10 when that second step is performed in relation to the power cord 400 rather than the Romex/BX cable 58. More particularly, in this modified version of the second step, the operator inserts the strain relief component (or grommet) 340 into the side orifice 322 of the terminal cover 300 and additionally inserts the cover control switch cord 56 (the end opposite the end coupled to the primary body 52) including the first and second wire leads 350 and 352 through the side orifice 322 and through the strain relief component therewithin, from the exterior of the terminal cover 300 into the interior space 312 of the terminal cover. Additionally, the operator inserts the power link coupler 342 into (or in relation to) the bottom orifice 320 of the terminal cover 300 and additionally inserts the power cord 400 (the free end opposite the end intended for coupling to a wall outlet) including third, fourth, and fifth wire leads thereof (corresponding to the third, fourth, and fifth wire leads 354, 356, and 357 of the Romex/BX cable 58) through the bottom orifice 320 and through the power link coupler (or grommet) 342, from the exterior of the terminal cover 300 into the interior space 312 of the terminal cover. Upon completion of this modified version of the second step, each of the cover control switch cord 56 and the power cord 400 are coupled to and secured relative to the terminal cover 300, in a manner such that each of the first and second wire leads 350, 352 of the cover control switch cord and the third, fourth, and fifth wire leads of the power cord 400 are positioned within the interior space 312 (again see FIG. 8).

It should further be appreciated that, subsequent to the performing of the modified version of the second step as illustrated by FIG. 22, the method of assembling the food waste disposer assembly proceeds in the same manner as described above with respect to FIGS. 11 through 20, except insofar as the method involves the power cord 400 (and associated third, fourth, and fifth wire leads) rather than the Romex/BX cable 58. Thus, in contrast to the third, fourth, and fifth steps illustrated by FIGS. 11, 12, and 13, respectively, the modified versions of those steps—and particularly the modified versions of the third and fifth steps—involve coupling of the third and fourth wire leads of the power cord 400 to the start switch interface connector 344 and the coupling of the fifth wire lead of the power cord to the second wire lead 352 of the cover control switch cord 56, by way of the wire joiner connector 346 (or alternatively the wire nut 399 as mentioned in relation to FIG. 21). Further, in contrast to the sixth step illustrated by FIGS. 14 and 15, the seventh step illustrated by FIGS. 16, 17, and 18, and the eighth step illustrated by FIG. 19, the modified versions of those steps are identical except insofar as the terminal assembly that is aligned with and coupled to the LEF 106 includes a portion of the power cord 400 rather than the Romex/BX cable 58 that is included with the terminal assembly 380. The method then again finishes with the ninth step illustrated by FIG. 20, in which the primary body 52 of the control switch mechanism 50 (e.g., the cover control switch) is attached in place with respect to the AV extension tube at the top of the food waste disposer.

It will be appreciated from the above discussion that the LEF connecting components 54 allow for either the Romex/BX cable 58 or the power cord 400 to be coupled to the start switch 388 by way of the start switch interface connector 344 and wire joiner connector 346 (or wire nut 399), depending upon the installation circumstance or environment. Also, in some installation circumstances or environment, it can be possible for a food waste disposer assembly to be coupled to a power source by way of either one of the Romex/BX cable 58 or the power cord 400, if both the Romex/BX cable is present and also a wall outlet is present. Given these considerations, it will be appreciated that in at least some circumstances or embodiments, the methods of assembly/installation of the food waste disposer assembly described above in regard to FIGS. 9-22 can include a preliminary step (prior to the first step) at which the operator determines whether installation involving the Romex/BX cable 58 or installation involving the power cord 400 is appropriate taking into account the installation circumstance, environment, or operator preference (if both the Romex/BX cable 58 and wall outlet are present). If it is determined at this preliminary step that installation involving the Romex/BX cable 58 is appropriate, then the method continues as described above in regard to FIGS. 9 through 20 (and/or FIG. 21, if the wire nut 399 is utilized instead of the wire joiner connector 346). Alternatively, if at this preliminary step, it is determined that installation involving the power cord 400 is appropriate, then the method continues with the modified versions of the steps of the process described above in regard to FIGS. 9 through 20, with those steps being modified to accommodate the power cord as shown in FIG. 22 (also, again, the wire joiner connector 346 or the wire nut 399 can be utilized depending upon the embodiment).

The present disclosure is also intended to encompass further embodiments and modified versions of the above-described embodiments in addition to the embodiments specifically described above. Among other things, although the above description relates to food waste disposers, the present disclosure is also intended to encompass embodiments relating to other types of waste disposers. Also, notwithstanding the description above regarding embodiments in which a terminal cover (or junction box) is attached to the LEF of the disposer and according to which the control/trigger switch cords and power cords enter the junction box at right angles or substantially right angles, the present disclosure is also intended to encompass other embodiments. For example, in some alternate embodiments, both wire bundles (e.g., associated with the cover control mechanism and associated with the power cord or Romex or BX cord or cable) may be inserted straight up through the bottom of the disposer with a combined strain relief. Also, depending upon the embodiment, wire joiner connectors, standard wire nuts, or other connectors or fasteners can be employed to join the various conductors. Also, although the present disclosure envisions embodiments in which a food waste disposer assembly is coupled to a wall outlet by way of a power cord having a plug such as a NEMA 5-15 plug, the present disclosure is also intended to encompass other embodiments that include or operate in conjunction with other types of connectors, plugs, and adapters, including for example C-13 or C14 sockets or plugs.

In view of the above discussion, the present disclosure encompasses embodiments of waste disposer assemblies in which the disposer assemblies include cover control mechanisms having primary bodies arranged at or near the top of the disposer assemblies, including for example cover control mechanisms that can be actuated based upon the presence or movement of an interlock device within a drain opening of the disposer. Nevertheless, the present disclosure additionally encompasses other embodiments of waste disposer assemblies that do not include cover control mechanisms. In this regard, the present disclosure particularly encompasses additional embodiments of waste disposer assemblies in which the waste disposers can be coupled to receive electric power either by a Romex/BX cable such as the Romex/BX cable 58 (or other hardwiring) or by a power cord that can be plugged into a wall outlet or other power source. In some such embodiments, the waste disposer assemblies can be food waste disposer assemblies that include LEF connecting components such as terminal covers that are identical or similar to one or more of the LEF connecting components described above in regard to the food waste disposer assembly 10. In some such embodiments that do not involve a cover control mechanism, one or more of the LEF connecting components (such as terminal covers) can be considered to be parts of or associated with the waste disposers, or the Romex/BX cables, or the power cords (or two or more of these, or none of these), depending upon the embodiment or circumstance.

Figure 23:
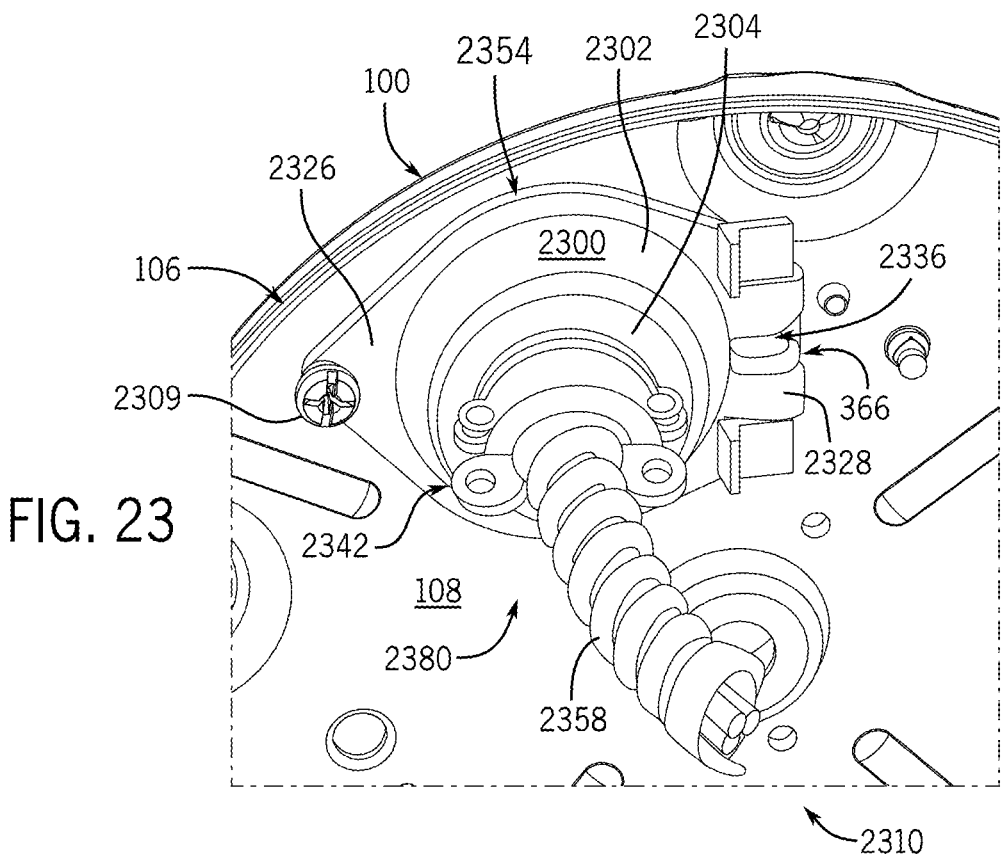
FIG. 23 is a cutaway, bottom perspective view of example portions of a food waste disposer assembly that includes the food waste disposer of FIG. 1 in combination connecting components and a cutaway portion of a Romex/BX cable, in accordance with an additional embodiment.

In this regard, FIG. 23 shows a cutaway, bottom perspective view of example portions of a food waste disposer assembly 2310 that includes the food waste disposer 100 of FIG. 1 in combination with LEF connecting components 2354 including a terminal cover 2300 (or junction box), as well as shows a cutaway portion of a Romex/BX cable 2358. As described previously in regard to FIG. 1, the food waste disposer 100 particularly includes the LEF 106 having the bottom surface 108. FIG. 23 particularly shows the LEF connecting components 2354 to be coupled along the bottom surface 108 of the LEF 106.

Figure 28:
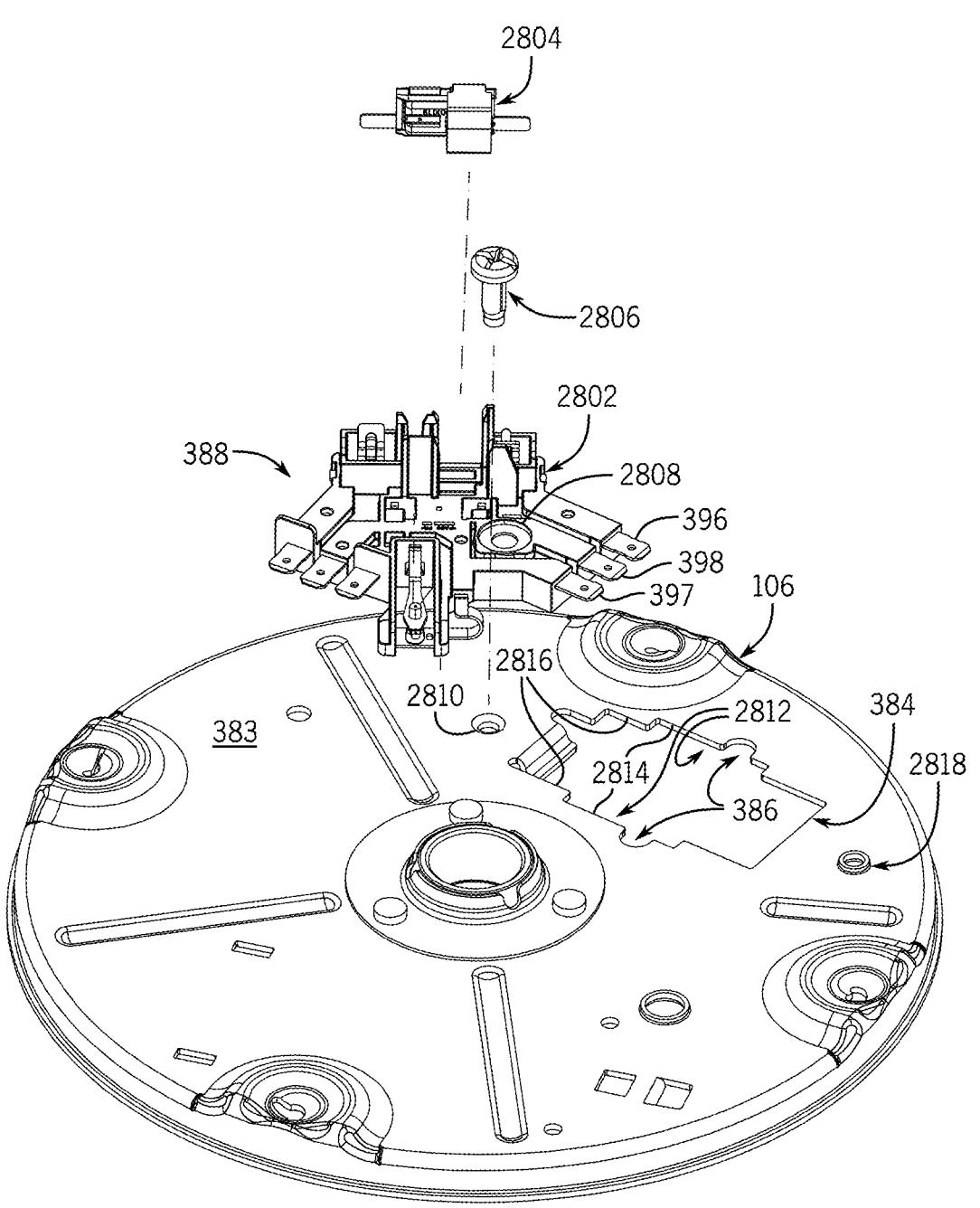
FIG. 28 is a top perspective view of a lower end frame (LEF) of the food waste disposer of FIG. 26 (and FIG. 1), with a start switch shown to be exploded from the LEF.

Referring additionally to FIG. 28, an additional top perspective view is provided of the LEF 106, with the start switch 388 exploded therefrom. The additional top perspective view particularly shows the inner (top or inwardly-facing) surface 383 of the LEF 106 that is on the opposite side of the LEF 106 relative to the bottom surface 108 shown in FIG. 23 (where that inner surface is inwardly-facing toward the interior of the food waste disposer 100 when the food waste disposer is fully-assembled). The start switch 388 is shown to be exploded from the LEF 106 at a location above the inner surface 383, with the exploded components of the start switch 388 including a primary start switch portion 2802 having (among other features) the first, second, and third input tabs 396, 398, and 397, respectively, as well as a secondary start switch portion 2804, and a fastening screw 2806. The fastening screw 2806 can be employed to attach the start switch 388 to the LEF 106, by passing through an orifice 2808 within the primary start switch 2802 and screwing into an orifice 2810 within the LEF 106. Additionally, the LEF 106 is shown to include the generally-rectangular LEF opening (or orifice) 384, which is described in further detail below.

In the present embodiment, when the LEF connecting components 2354 are mounted on the food waste disposer 100 as shown in FIG. 23, the terminal cover 2300 has a bottom wall 2304 that is substantially parallel to the bottom surface 108 of the LEF 106, and the Romex/BX cable 2358 enters the terminal cover 2300 in a direction that is substantially normal (or perpendicular) to the bottom wall 2304 of the terminal cover and the bottom surface 108 of the LEF. Further as shown, the terminal cover 2300 generally takes the form of a cup that includes, in addition to the bottom wall 2304, an annular (or substantially annular or cylindrical) side wall 2302 and a rim portion 2314. The annular side wall 2302 extends upward (when the food waste disposer 100 is arranged in a conventional manner, with the bottom surface 108 along the bottom of the disposer) from the bottom wall 2304 to the rim portion 2314, so as to define the cup in terms of defining an interior space 2312 (see FIG. 24). Also, it should be appreciated that the bottom wall 2304 includes a bottom orifice (which, although not visible, is identical or similar to the bottom orifice 320 described above) that is configured to receive the Romex/BX cable 2358. The interior space 2312 is entirely enclosed except for the bottom orifice and a top opening 2324 defined by the rim portion 2314.

Similar to the terminal cover 300 described above, the terminal cover 2300 includes a first rim extension (or lip) 2326 and a second rim extension (or lip) 2328, each of which extends outward from the central section of the rim portion 2314 and away from the annular side wall 2302, in a manner that is parallel or substantially parallel to the bottom wall 2304. As shown, the first rim extension 2326 extends outward away from the annular side wall 2302 in a first direction that is opposite or substantially opposite a second direction in which the second rim extension 2328 extends outward from the annular side wall, and both of the first and second rim extensions 2326 and 2328 can be considered to form parts of the rim portion 2314. More particularly, the first rim extension 2326 is a substantially triangular formation having a round orifice 2334 (see FIG. 24) therein, and the second rim extension 2328 is a substantially rectangular formation having an elongated slot 2336 that also extends generally outward away from the annular side wall 2302. In the present embodiment, the terminal cover 2300 is made as a zinc casting. The use of a zinc casting can be desirable in terms of making it easier to achieve the complex shape of the terminal cover 2300 that is suitable for the desired manner of wire routing. In other embodiments, the terminal cover 2300 can be made from other materials such as steel, or in other manners.

As shown, the LEF connecting components 2354 in the present embodiment include not only the terminal cover 2300 but also a strain relief component (or simply strain relief) 2342 as well as the start switch interface connector 344 (which is the same as that described in regard to FIG. 9). The Romex/BX cable 2358 can be secured in relation to the terminal cover 2300 by way of the strain relief component 2342. The strain relief component 2342 (which can also be referred to as a power link coupler, or a Romex/BX coupler) in the present embodiment can take the form of a commonly available electrical component typically used to ground metallic sheathed cable (BX) and/or secure the Romex/BX cable to another component such as, for example, an electrical outlet box or an adapter (in alternate embodiments, the strain relief component can take other forms, such as a grommet). Insofar as the present embodiment does not employ any cover control mechanism, the LEF connecting components 2354 do not (in contrast to some embodiments described above) include any wire joiner, wire joiner connector, wire nut, or further strain relief component corresponding to the strain relief component 340 described above.

Figure 24:
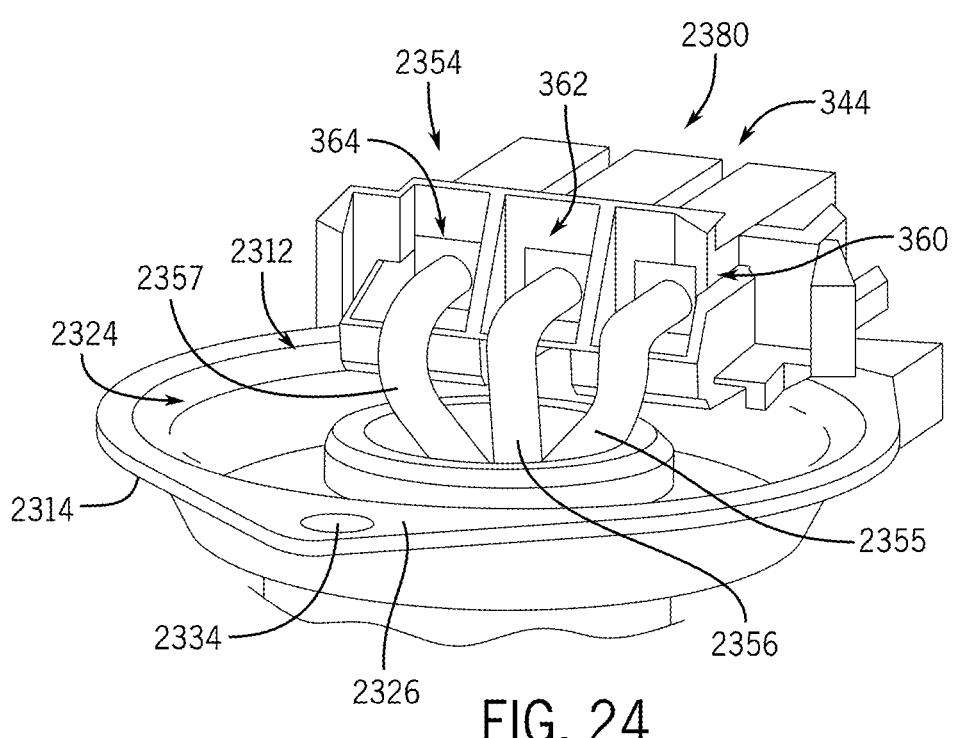
FIG. 24 is a perspective side view of the connecting components, in addition to a cutaway portion of the Romex/BX cable, of FIG. 23.

Turning to FIG. 24, a perspective side view is provided of the LEF connecting components 2354, along with cutaway portions of the Romex/BX cable, disassembled from the food waste disposer 100, so as to reveal additional features of the LEF connecting components and the interconnection of the Romex/BX cable with the LEF connecting components. In particular, FIG. 24 shows that the start switch interface connector 344 is attached to the terminal cover 2300 so as to be secured relative to the terminal cover. In the present embodiment, the start switch interface connector 344 particularly is attached to the terminal cover 2300 by the pronged deformable snapping features 366 of the start switch interface connector. When the start switch interface connector 344 is assembled relative to the terminal cover 2300, the pronged deformable snapping features 366 extend into and at least partly through the elongated slot 2336 so as to snap into place behind the elongated slot as shown in FIG. 23 (which shows the snapping features 366 jutting out of the elongated slot 2336 after having been pushed therethrough).

Additionally, FIG. 24 shows that all three wire leads of the Romex/BX cable 2358 are coupled to the start switch interface connector 344 in the present embodiment. That is, first, second, and third wire leads 2355, 2356, and 2357, respectively (the white/neutral, green/ground, and black/live leads, respectively), of the Romex/BX cable 2358 are respectively positioned into the first, second, and third input ports 360, 362, and 364, respectively, of the start switch interface connector 344. Upon the coupling of first, second, and third wire leads 2355, 2356, and 2357, respectively, with the first, second, and third input ports 360, 362, and 364, respectively, of the start switch interface connector 344, an overall terminal assembly 2380 is formed. The terminal assembly 2380 in the present embodiment particularly includes the terminal cover 2300, the start switch interface connector 344, the strain relief component 2342, and the end of the Romex/BX cable 2358 (including the wire leads 2355, 2356, and 2357) and, upon being formed, is ready to be installed or coupled in relation to the LEF 106 of the food waste disposer 100.

For purposes of the present description, the terminal assembly 2380 can be considered to be distinct from the food waste disposer 100. Further in the present embodiment, the terminal assembly 2380 both includes components that are considered parts of the food waste disposer assembly 2310, such as the LEF connecting components 2354 including the terminal cover 2300, and also includes components that are (at least as described above) not considered to be part of the food waste disposer assembly 2310, namely, the first, second, and third wire leads 2355, 2356, and 2357 of the Romex/BX cable 2358. Nevertheless, in some other contexts, the terminal assembly can be understood to include all of the components of the terminal assembly 2380 except for any portions of the Romex/BX cable 2358 such as the wire leads 2355, 2356, and 2357 (e.g., the terminal assembly can be understood to only include the LEF connecting components 2354). Also, in some other contexts, the terminal assembly can be understood as including both the LEF connecting components 2354 and also the Romex/BX cable 2358 or at least portions thereof (such as the wire leads 2355, 2356, and 2357), and all of those structures can also be considered to be encompassed by the food waste disposer assembly (or even the food waste disposer 100).

Figures 25, 26, 27:
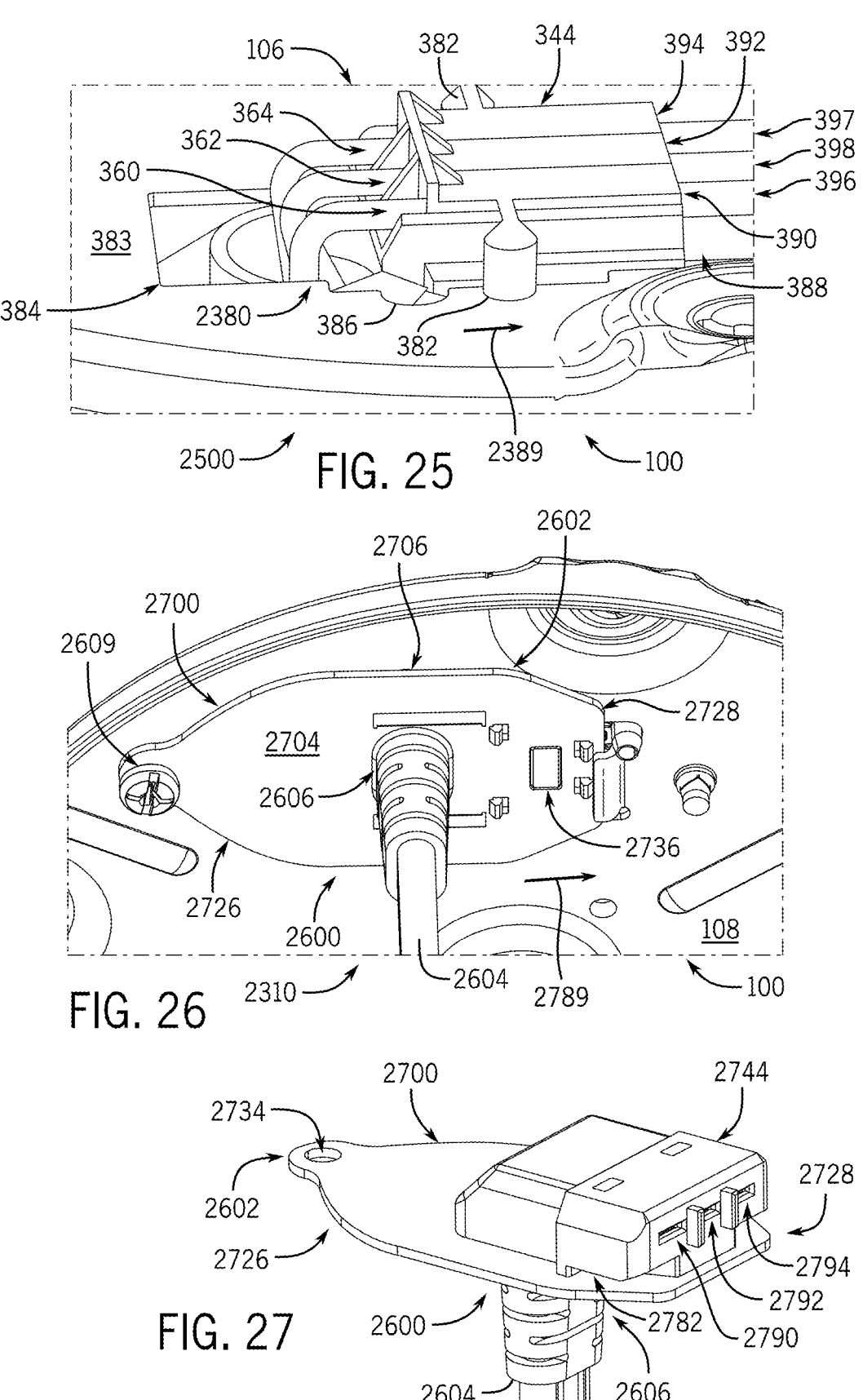
FIG. 25 shows an additional side perspective, cutaway view of a portion of the food waste disposer along with a terminal assembly installed in relation to thereto, when viewed from the interior of the food waste disposer, the terminal assembly including the connecting components and one or more portions of the Romex/BX cable of FIG. 23 and FIG. 24.
FIG. 26 is a perspective, cutaway view of a food waste disposer assembly that includes the food waste disposer of FIG. 1 in combination with a power cord assembly, in accordance with an additional embodiment.
FIG. 27 is a top perspective, cutaway view of the power cord assembly of FIG. 26.

Further, FIG. 25 shows an additional side perspective, cutaway view of a portion 2500 of the food waste disposer 100 and terminal assembly 2380 when the terminal assembly has been fully installed in relation to the food waste disposer 100, when viewed from the interior of the food waste disposer. As shown, when fully installed, the terminal assembly 2380 is positioned so that the start switch interface connector 344 is coupled to the start switch 388 of the food waste disposer. Given this manner of coupling, the terminal assembly 2380 is directly couplable to the food waste disposer 100, particularly the start switch 388 thereof.

It should be appreciated that, in the present embodiment, the terminal assembly 2380 is installed and coupled relative to the food waste disposer 100 in the same or substantially the same manner as described above in regard to the terminal assembly 380. That is, installation/assembly of the terminal assembly 2380 in relation to the LEF 106 generally involves several steps. At a first step, an operator strips (e.g., by way of a wire stripping tool) each of the first, second, and third wire leads 2355, 2356, and 2357 (e.g., the white, green, and black wires) of the Romex/BX cable 2358. In the present embodiment, each of these wire leads 2355, 2356, and 2357 is stripped to a push in terminal distance. As illustrated in FIG. 9, the start switch interface connector 344 includes the wire stripping feature 358 that shows the extent to which each of the first, second, and third leads 2355, 2356, and 2357 should be stripped.

Next, at a second step represented by FIG. 23 and FIG. 24, the operator inserts and secures, relative to the terminal cover 2300, the Romex/BX cable 2358. More particularly, in this second step, the operator inserts the strain relief 2342 into (or in relation to) the bottom orifice of the terminal cover 2300 and additionally inserts the Romex/BX cable 2358 (the free end opposite the end coupled to any power source) including the first, second, and third wire leads 2355, 2356, and 2357 through the bottom orifice and through the strain relief (or grommet) 2342, from the exterior of the terminal cover 2300 into the interior space 2312 of the terminal cover. Additionally, also as part of the second step, the first, second, and third wire leads 2355, 2356, and 2357, respectively (the white/neutral, green/ground, and black/live leads, respectively), of the Romex/BX cable 2358 are respectively positioned into and coupled to the first, second, and third input ports 360, 362, and 364, respectively, of the start switch interface connector 344 (which also can be referred to as a three pin terminal block). Further, additionally as part of the second step, the start switch interface connector 344 is attached to the terminal cover 2300. In particular, the attachment of the start switch interface connector 344 involves snapping that connector in place with respect to the terminal cover 2300 by causing the snapping features 366 to pass through and be snapped in relation to the elongated slot 2336 (so that the tips of the snapping features protrude out of the bottom surface of the terminal cover as shown in FIG. 23). Upon completion of this second step, the Romex/BX cable 2358 is coupled to and secured relative to the terminal cover 2300, in a manner such that each of the first, second, and third wire leads 2355, 2356 and 2357 are positioned in the interior space 2312.

Further, at a third step (corresponding to the sixth step represented by FIGS. 14 and 15 described above), the terminal assembly 2380 is aligned and fitted into the LEF 106. As noted previously, the start switch interface connector 344 includes first and second keying tabs (or protrusions) 382 arranged on opposite sides of that start switch interface connector, generally above opposite sides of the second rim extension 2328. The LEF 106 includes the generally-rectangular LEF opening (or orifice) 384 that includes the first and second keying recesses 386 (as shown in FIG. 25 and FIG. 28, and also FIG. 15) that respectively are complementary in shape to the first and second keying tabs 382, such that the start switch interface connector is keyed to the LEF opening. The LEF opening 384 including the keying recesses 386 is shaped and sized so that, as the terminal assembly 380 reaches the bottom surface 108 of the LEF 106, the start switch interface connector 344 is able to proceed into the food waste disposer 100 and be positioned above the inner (top or inwardly-facing) surface 383 of the LEF, as shown in FIG. 25. Although the start switch interface connector 344 is positioned above the inner surface 383 of the LEF 106 when the terminal assembly 2380 is aligned and fitted into the LEF 106, it should further be appreciated from FIGS. 23 and 25 that the terminal cover 2300 remains positioned entirely below the bottom surface 108 of the LEF 106, with the first and second rim extensions 2326 and 2328 being positioned so as to abut and interface that bottom surface.

Additionally, subsequent to the third step, at a fourth step (corresponding to the seventh step represented by FIG. 16) the terminal assembly 2380 is slid relative to the LEF 106 so that the start switch interface connector 344 is pushed ahead tight against the start switch 388 that is mounted and supported upon the inner surface 383 of the LEF 106. As discussed previously in regard to FIG. 15, it will be appreciated from FIG. 25 that the start switch interface connector 344 includes the first, second, and third output ports 390, 392, and 394, respectively, that are opposed to (and coupled electrically to) the first, second, and third input ports 360, 362, and 364, respectively, and additionally that the start switch 388 includes the first, second, and third input tabs 396, 398, and 397, respectively. Further there is a gap (not shown) at least between certain portions of the start switch interface connector 344 such as the keying tabs 382 and certain portions of the terminal cover 2300 such as the first and second rim extensions 2326 and 2328. Given this arrangement, it is possible for a user/installer to cause the terminal assembly 2380, and particularly the start switch interface connector 344, to slide in a direction indicated by an arrow 2389 shown in FIG. 25 relative to the LEF 106 until (as shown in FIG. 25) the respective first, second, and third input tabs 396, 398, and 397 are positioned (or fit)

within, and electrically coupled to, the respective first, second, and third output ports 390, 392, and 394, respectively.

Given such installation, it will be appreciated that the first, second, and third input tabs 396, 398, and 397 of the start switch 388 are electrically coupled to the first, second, and third wire leads 2355, 2356, and 2357, respectively, of the Romex/BX cable 2358. Further, when such installation has been completed, it should be recognized that a switchable electrical circuit is completed between the Romex/BX cable 2358 and the start switch 388 (and associated motor of the food waste disposer). In particular, this electrical circuit can be understood to extend from the third wire lead (e.g., the black, live power lead) 2357 of the Romex/BX cable 2358 to the motor via the start switch interface connector 344 and the start switch 388, insofar as the third wire lead is coupled to the start switch interface connector that is in turn connected to the motor via the switch module (depending upon switching status of the switch module). Further, the electrical circuit is completed, at least in terms of the circuit being coupled back to the Romex/BX cable 2358, insofar as the motor is coupled to one or both of the first wire lead 2355 and the second wire lead 2356 of the Romex/BX cable again by way of the start switch 388 and start switch interface connector 344.

Upon completion of the fourth step, a fifth step in the installation process is performed in which the terminal assembly 2380 is secured to the food waste disposer 100 and particularly to the LEF 106, as shown in FIG. 23. In the present example embodiment, the terminal assembly 2380 is secured to the food waste disposer 100 by way of screwing-in a fixing screw 2309 through the round orifice 2334 in the terminal cover 2300 and then subsequently into a receiving orifice 2818 (not shown in FIG. 23, but shown in FIG. 28) that is provided in the LEF 106, when the terminal assembly 2380 has been slid into position (so that the start switch interface connector 344 is engaged with the start switch 388 as described above). By screwing-in the fixing screw 2309, the terminal assembly 2380 is locked into position relative to the LEF 106. In particular, when locked in this position, the terminal assembly 2380 cannot slide away from and disengage from the start switch 388. Further, when locked in this position, the keying tabs 382 are not aligned with the keying recesses 386, and thus the terminal assembly 2380 is retained against the LEF 106 insofar as the start switch interface connector 344 is in contact with the inner surface 383 and cannot pass through the LEF 106 out of the food waste disposer 100. That is, by virtue of the keying tabs (or LEF tabs) 382 being positioned along the inner surface 383 of the LEF 106 at locations where there are none of the keying recesses 386, the terminal assembly 2380 (and particularly the front of the terminal assembly, that is, the portion closest to the start switch 388) also is secured relative to the LEF.

It should be appreciated that, depending upon the embodiment, the fixing screw 2309 can be considered a part of the food waste disposer 100 (and/or the LEF 106 thereof) or alternatively can be considered one of the LEF connecting components 2354 (and/or part of the terminal assembly 2380). In embodiments in which the fixing screw 2309 is included as part of the food waste disposer 100 (e.g., as originally purchased), the above-described method should be understood to include a preliminary step of removing the fixing screw 2309 from the LEF 106 prior to the installation of the terminal assembly 2380 with respect to the LEF 106. Alternatively, if the fixing screw 2309 is considered to be one of the LEF connecting components 2354, then no preliminary step of removing the fixing screw from the LEF needs to be performed.

Although FIGS. 23, 24, and 25 illustrate the food waste disposer assembly 2310 as including LEF connecting components 2354 that are coupled to the Romex/BX cable 2358, the present example embodiment also is one that can accommodate implementation of a power cord having a plug that plugs into a wall outlet (e.g., a NEMA 5-15 plug) so as to provide power to the food waste disposer 100. More particularly in this regard, FIG. 26 shows a secondary implementation of the food waste disposer assembly 2310 in which the food waste disposer assembly not only includes the food waste disposer 100 but also includes, as a substitute for the LEF connecting components 2354, a power cord assembly 2600. That is, in the present embodiment, the food waste disposer assembly 2310 both includes the LEF connecting components 2354 that can be installed in relation to the food waste disposer 100 in a first implementation in which the food waste disposer 100 is coupled to the Romex/BX cable 2358, and also includes the power cord assembly 2600 that can be installed in relation to the food waste disposer 100 in a second implementation in which the food waste disposer can be coupled to a wall outlet by the power cord.

Figures 29, 30, 31:
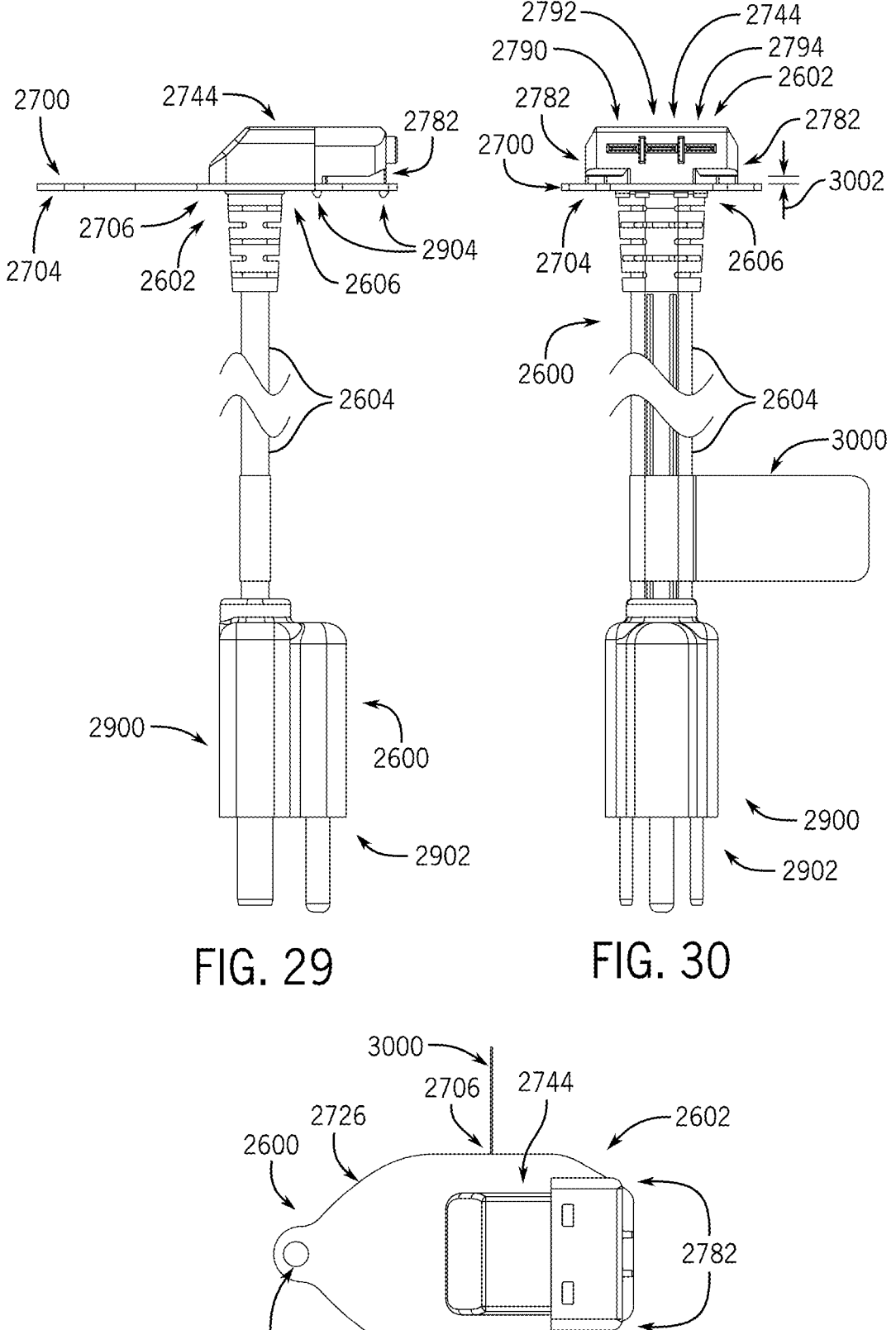
FIG. 29, FIG. 30, and FIG. 31 respectively show front elevation, right side elevation, and top plan views of the power cord assembly of FIG. 26, with the front elevation and right side elevation views providing a broken view of an integrated power cord of the power cord assembly.

FIG. 26 particularly provides a perspective, cutaway view of the food waste disposer assembly 2310 at a time when the power cord assembly 2600 is installed relative to the food waste disposer 100, and when the LEF connecting components 2354 (and any associated Romex/BX cable) are not installed in relation to the food waste disposer. Further, FIG. 29, FIG. 30, and FIG. 31 respectively show front elevation, right side elevation, and top plan views of the power cord assembly 2600 when it is separate from (not installed relative to) the food waste disposer 100. As shown, the power cord assembly 2600 includes additional LEF connecting components 2602 along with an integrated power cord 2604 having a first end 2606 that extends into a terminal cover 2700 of the LEF connecting components 2602. Although not shown in FIG. 26 or FIG. 31, it should be appreciated from FIG. 29 and FIG. 30 that the integrated power cord 2604 also includes a second end 2900 along its length extending away from the terminal cover 2700 and opposite the first end 2606 and, at the second end, a plug 2902 is provided that is configured for being plugged into a wall outlet (e.g., a NEMA 5-15 plug). It will be noted that FIG. 29 and FIG. 30 provide broken views of the integrate power cord 2604. Additionally, a label 3000 is also visible extending from the integrated power cord 2604 in FIG. 30 and FIG. 31.

Referring additionally to FIG. 27, a top perspective, cutaway view is provided of the power cord assembly 2600, with the integrated power cord 2604 particularly being shown in cutaway (again with the second end not being shown). Each of FIG. 27, FIG. 29, FIG. 30, and FIG. 31 particularly shows that the power cord assembly 2600 includes a start switch interface connector 2744 that is attached to the terminal cover 2700 so as to be secured relative to the terminal cover and, in the present embodiment, the additional LEF connecting components 2602 can be understood to include both the terminal cover 2700 and the start switch interface connector 2744. Depending upon the embodiment, the start switch interface connector 2744 can be attached to the terminal cover 2700 in any of a variety of manners (e.g., although not shown in FIG. 26, but as partly visible in FIG. 29, such attachment can in some embodiments be accomplished by coupling deformable snapping features such as snapping features 2904 of the start switch interface connector with the terminal cover 2700; alternatively, such attachment can in some other embodiments be accomplished by coupling pronged deformable snapping features such as the snapping features 366 of the start switch interface connector with the terminal cover 2700). Further, in the present embodiment, the first end 2606 of the integrated power cord 2604 extends into a central portion 2706 of a bottom wall 2704 of the terminal cover 2700, and through the terminal cover, to the start switch interface connector 2744. Although not shown, wires within the integrated power cord 2604 are thus coupled to the start switch interface connector 2744. Also, when fully installed, the power cord assembly 2600 is positioned so that the start switch interface connector 2744 is coupled to the start switch 388 of the food waste disposer. Given this manner of coupling, the power cord assembly 2600 is directly couplable to the food waste disposer 100, particularly the start switch 388 thereof.

The terminal cover 2700 includes a first extension (or lip) 2726 and a second extension (or lip) 2728 that respectively extend outward, in opposite directions, away from the central portion 2706 of the terminal cover into which the integrated power cord 2604 extends. The extension 2726 has a round orifice 2734 therein (see FIG. 27 and FIG. 31), and the second extension 2728 has a slot 2736 (which in some embodiments can be a feature by which the start switch interface connector 2744 is coupled to the terminal cover). In the present embodiment, the terminal cover 2700 is made as a zinc casting although, in other embodiments, the terminal cover 2700 can be made from other materials such as steel, or in other manners.

Additionally with respect to the terminal covers 2300 and 2700, it should be appreciated that the particular images provided in each of FIG. 23, FIG. 24, FIG. 25, FIG. 26, FIG. 27, FIG. 28, FIG. 29, FIG. 30, and FIG. 31 may not be drawn to scale and/or may show different components from different perspectives or angles. Regardless of the exact images provided in FIG. 23, FIG. 24, FIG. 25, FIG. 26, FIG. 27, FIG. 28, FIG. 29, FIG. 30, and FIG. 31, it should be appreciated that, in the present embodiment, the terminal cover 2300 and terminal cover 2700 are identical or substantially similar in terms of the surface area extents of those respective terminal covers, that is, in terms of the extents to which those terminal covers 2300 and 2700 respectively interface or overlap the bottom surface 108 of the LEF 106 when those respectively terminal covers are coupled thereto. In particular, it should be appreciated that the length of the terminal cover 2700 from the first extension 2726 to the second extension 2728 is identical or substantially similar to the length of the terminal cover 2300 from the first rim extension 2326 to the second rim extension 2328. Nevertheless, in alternate embodiments, the terminal cover 2300 and terminal cover 2700 need not be identical or substantially similar in these manners but rather can exhibit more significant differences relative to one another.

It will be appreciated that, in the present embodiment, no steps need to be performed to assemble the integrated power cord 2604 with the additional LEF connecting components 2602 because that power cord is (prior to installation) already coupled to/integrated with those additional LEF connecting components and particularly the start switch interface connector 2744 (although, in alternate embodiments, the installation process can involve the coupling of wire leads of a power cord into input ports of a start switch interface connector such as the input ports 360, 362, and 364 described above). Otherwise, it should be appreciated that, in the present embodiment, the power cord assembly 2600, and particularly the additional LEF connecting components 2602 thereof, are installed and coupled relative to the food waste disposer 100 in a manner that is similar to the manner described above in regard to the terminal assembly 2380. That is, installation/assembly of the terminal assembly 2380 in relation to the LEF 106 generally involves several steps.

More particularly in this regard, at a first step (corresponding to the third step described above in regard to the terminal assembly 2380, as well as the sixth step represented by FIGS. 14 and 15 described above) the power cord assembly 2600 is aligned and fitted into the LEF 106. As with the start switch interface connector 344, the start switch interface connector 2744 includes first and second keying tabs (or protrusions) 2782 arranged on opposite sides of that start switch interface connector, generally above opposite sides of the second extension 2728 as shown in FIG. 27, FIG. 29, FIG. 30, and FIG. 31. The first and second keying tabs 2782 can also be viewed as cantilevered side walls that overhang opposite sides of the second extension 2728. Additionally, the LEF 106 includes the generally-rectangular LEF opening (or orifice) 384 that not only includes the first and second keying recesses 386 (as shown in FIG. 25 and also FIG. 15) described above, but also includes first and second additional keying recesses 2812 that respectively are complementary in shape to the first and second keying tabs 2782, such that the start switch interface connector 2744 is keyed to the LEF opening.

The LEF opening 384 including the keying recesses 2812 (in addition to the keying recesses 386) is shaped and sized so that, as the power cord assembly 2600 reaches the bottom surface 108 of the LEF 106, the start switch interface connector 2744 is able to proceed into the food waste disposer 100 through the LEF opening and be positioned above the inner (top or inwardly-facing) surface 383 of the LEF (as shown in FIG. 25 and FIG. 28). That is, when the power cord assembly 2600 reaches the bottom surface 108 of the LEF 106, the keying tabs 2782 are able to pass by respective side edges 2814 of the first and second additional keying recesses 2812 (see FIG. 28) and into the interior of the food waste disposer 100. Although the start switch interface connector 2744 is positioned above the inner surface 383 of the LEF 106 when the power cord assembly 2600 is aligned and fitted into the LEF 106, it should further be appreciated that the terminal cover 2700 (and the first and second extensions 2726 and 2728) remains positioned entirely below the bottom surface 108 of the LEF 106, so as to abut and interface that bottom surface.

Additionally, subsequent to the first step, at a second step (corresponding to the fourth step described above in regard to the terminal assembly 2380, as well as the seventh step represented by FIG. 16) the power cord assembly 2600 is slid relative to the LEF 106 so that the start switch interface connector 2744 is pushed ahead tight against the start switch 388 that is mounted and supported upon the inner surface 383 of the LEF 106 (e.g., in the same manner as shown in FIG. 25). In the present embodiment, the start switch interface connector 2744 includes first, second, and third output ports 2790, 2792, and 2794, respectively, which can be respectively coupled to different wires within the integrated power cord 2604. Additionally, as discussed previously, the start switch 388 includes the first, second, and third input tabs 396, 398, and 397, respectively (see FIG. 25). Further there are one or more respective gaps (not shown in FIG. 26, but visible in FIG. 27, FIG. 29, and FIG. 30) at least between certain portions of the start switch interface connector 2744 such as the keying tabs 2782 and certain portions of the terminal cover 2700. In the present example, as particularly visible in FIG. 30 (and also partly visible in FIG. 29), gaps 3002 particularly exist between each of the keying tabs 2782 and the corresponding portions of the second extension 2728 of the terminal cover 2700 over which those keying tabs extend.

Given this arrangement, during the second step it is possible for a user/installer to cause the power cord assembly 2600, and particularly the start switch interface connector 2744, to slide in a direction indicated by an arrow 2789 shown in FIG. 26 relative to the LEF 106 so that the respective first, second, and third input tabs 396, 398, and 397 are positioned (or fit) within, and electrically coupled to, the respective first, second, and third output ports 2790, 2792, and 2794, respectively. When the power cord assembly 2600 is slid in this manner, the power cord assembly 2600 particularly is slid from a first position, in which the first and second keying tabs 2782 respectively are aligned with the first and second additional keying recesses 2812, respectively (as will be the case after completion of the first step during which the start switch interface connector 2744 is inserted through the LEF opening 384), to a second position in which the keying tabs extend over inwardly-jutting portions 2816 of the inner surface 383 of the LEF (see FIG. 28). In this second position, the inwardly-jutting portions 2816 particularly extend into the gaps 3002 (see FIGS. 30 and 29) between the keying tabs 2782 and the terminal cover 2700.

Additionally, given such installation, it will be appreciated that the first, second, and third input tabs 396, 398, and 397 of the start switch 388 are electrically coupled, via the start switch interface connector 2744, with respective wires within the integrated power cord 2604. Further, when such installation has been completed, it should be recognized that a switchable electrical circuit is completed between the integrated power cord 2604 (and the plug at the second end thereof) and the start switch 388 (and associated motor of the food waste disposer).

Upon completion of the second step, a third step in the installation process is performed in which the power cord assembly 2600 is secured to the food waste disposer 100 and particularly to the LEF 106, as shown in FIG. 26. In the present example embodiment, the power cord assembly 2600 is secured to the food waste disposer 100 by way of screwing-in a fixing screw 2609 through the round orifice 2734 in the terminal cover 2700 and then subsequently into the receiving orifice 2818 (not shown in FIG. 26, but shown in FIG. 28) that is provided in the LEF 106, when the power cord assembly 2600 has been slid into position (so that the start switch interface connector 2744 is engaged with the start switch 388 as described above). By screwing-in the fixing screw 2609, the power cord assembly 2600 is locked into position relative to the LEF 106. In particular, when locked in this position, the power cord assembly 2600 cannot slide away from and disengage from the start switch 388. Further, when locked in this position, the keying tabs 2782 are not aligned with the keying recesses 2812 (or the keying recesses 386) but rather extend over the inwardly-jutting portions 2816. Thus, the power cord assembly 2600 is retained against the LEF 106 insofar as the start switch interface connector 2744 is in contact with the inner surface 383 and cannot pass through the LEF 106 out of the food waste disposer 100. That is, by virtue of the keying tabs (or LEF tabs) 2782 being positioned along the inner surface 383 of the LEF 106 at locations where there are none of the keying recesses 2812 (or 386), the power cord assembly 2600 (and particularly the portion closest to the start switch 388) also is secured relative to the LEF.

It should be appreciated that, depending upon the embodiment, the fixing screw 2609 can be considered a part of the food waste disposer 100 (and/or the LEF 106 thereof) or alternatively can be considered one of the additional LEF connecting components 2602 (and/or part of the power cord assembly 2600). In embodiments in which the fixing screw 2609 is included as part of the food waste disposer 100 (e.g., as originally purchased), the above-described method should be understood to include a preliminary step of removing the fixing screw 2609 from the LEF 106 prior to the installation of the power cord assembly 2600 with respect to the LEF 106. Alternatively, if the fixing screw 2609 is considered to be one of the additional LEF connecting components 2602, then no preliminary step of removing the fixing screw from the LEF needs to be performed.

It should be recognized that each of the terminal assembly 2380 of FIGS. 23, 24, and 25 (and particularly the LEF connecting components 2354 thereof) and the power cord assembly 2600 of FIGS. 26 and 27 (and particularly the additional LEF connecting components 2602 thereof) are configured to allow for quick and easy assembly of those structures in relation to the LEF 106 and the start switch 388 of the food waste disposer 100. Further, each of the terminal assembly 2380 of FIGS. 23, 24, and 25 (and particularly the LEF connecting components 2354 thereof) and the power cord assembly 2600 of FIGS. 26 and 27 (and particularly the additional LEF connecting components 2602 thereof) are configured as to be interchangeable relative to one another in relation to the LEF 106 and the start switch 388 of the food waste disposer 100.

More particularly, the start switch interface connector 344 of the terminal assembly 2380 and the start switch interface connector 2744 of the power cord assembly 2600 are substantially similar (or even, in some embodiments, identical) in terms of having first, second, and third output ports that are respectively couplable to the first, second, and third input tabs 396, 398, and 397, respectively (which can also respectively be referred to as connectors, or portions of connectors), of the start switch 388. That is, the start switch interface connector 344 has the first, second, and third output ports 390, 392, and 394 (which can also respectively be considered complementary formations relative to the input tabs) that are respectively couplable to the first, second, and third input tabs 396, 398, and 397, respectively, and the start switch interface connector 2744 has the first, second, and third output ports 2790, 2792, and 2794 (which can also respectively be considered complementary formations relative to the input tabs) that are respectively couplable to the first, second, and third input tabs, respectively.

Additionally, the start switch interface connector 344 of the terminal assembly 2380 and the start switch interface connector 2744 of the power cord assembly 2600 are also similar in terms of how those start switch interface connectors are configured to fit through the LEF opening 384 and slide in relation to the LEF 106 during installation so as to be retained relative to the LEF after installation is complete. The first and second keying recesses 386 and first and second additional keying recesses 2812 can together be viewed as forming first and second overall keying recesses on opposite sides of the LEF opening 384. That is, the first keying recess 386 and first additional keying recess 2812 on one side of the LEF opening 384 can be considered to form a first overall keying recess, and the second keying recess 386 and second additional keying recess 2812 on the other side of the LEF opening 384 can be considered to form a second overall keying recess.

Given this to be the case, each of the start switch interface connector 344 and the start switch interface connector 2744 operates in a similar manner insofar as each of the respective start switch interface connectors includes a respective pair of keying tabs (the keying tabs 382 and keying tabs 2782, respectively) that are configured to fit through the first and second overall keying recesses when the respective start switch interface connector is inserted through the LEF opening 384. Additionally, each of these start switch interface connectors 344 and 2744 further operates in a similar manner in that, when those respective start switch interface connectors are slid in relation to the LEF 106 so as to engage the start switch 388, the respective keying tabs of the respective start switch interface connectors (again, the keying tabs 382 and keying tabs 2782, respectively) pass over respective portions of the inner surface 383 of the LEF 106. Further, when the respective start switch interface connectors 344 and 2744 are positioned in this manner so as to engage the start switch 388, the respective portions of the inner surface 383 (over which the respective keying tabs are positioned) extend between those respective keying tabs and the respective terminal covers (the terminal cover 2300 and terminal cover 2700, respectively) to which those respective start switch interface connectors are attached, so that the respective start switch interface connectors are retained against the LEF 106 and within the food waste disposer 100.

It should be recognized that, notwithstanding the particular keying tabs 382 and 2782 described herein and notwithstanding the particular shape of the LEF opening 384 defined by the LEF 106 (and portions thereof, such as the inwardly-jutting portions 2816) as described herein, including the keying recesses 386 and 2812, the present disclosure is intended to encompass numerous other embodiments and arrangements. For example, in some additional embodiments, the first and second keying tabs 382 of the start switch interface connector 344 respectively can take a modified form so that those tabs are substantially identical (or identical) in shape (and size) relative to the first and second keying tabs 2782 of the start switch interface 2744, or vice-versa, and, in each case, the respective first and second keying tabs of each respective start switch interface connector are respectively complementary in shape (and size) relative to either the respective first and second keying recesses 386 or relative to the respective first and second additional keying recesses 2812 of the generally-rectangular LEF opening (or orifice) 384. Further, in some such additional embodiments, the LEF opening 384 can take a modified form in which only the first and second additional keying recesses 2812 are present but the first and second keying recesses 386 are not present, or alternatively in which only the first and second keying recesses 386 are present but the first and second additional keying recesses 2812 are not present.

Also, in the present embodiment, the shape (and size) of the start switch interface connector 344 is substantially the same as (or alternatively can be identical to) the shape (and size) of the start switch interface connector 2744 and, in each case, the respective start switch interface connector is sized so that the respective start switch interface connector can pass into the food waste disposer by way of the generally-rectangular LEF opening 384. The primary differences between the shape of the start switch interface connector 344 and the shape of the start switch interface connector 2744 involve the differences in the features of the first and second keying tabs 382 by comparison with the features of the first and second additional keying tabs 2782, along with structural differences relating to how the respective start switch interface connectors are coupled to the Romex/BX cable 2358 or power cord 2604, respectively. In other embodiments encompassed herein, the start switch interface connectors of the terminal assembly and power cord assembly can be more similar (or identical) in shape (and size) with one another, or can differ from one another in any of a variety of other respects.

Further, in the present embodiment, each of the terminal cover 2300 and the terminal cover 2700 is sized so that the respective cover can be positioned along the bottom surface 108 of the LEF 106 so as to cover over the generally-rectangular LEF opening 384. Additionally, each of the terminal cover 2300 and the terminal cover 2700 is configured so that, when the terminal assembly 2380 or the power cord assembly 2600 is fully inserted relative to the food waste disposer 100, in terms of the respective start switch interface connector 344 or 2744 being coupled to the start switch 388, installation can be completed by fully coupling the terminal assembly 2380 or the power cord assembly 2600 respectively to the LEF 106 by the respective fixing screw 2309 or fixing screw 2609. That is, in each case, when the terminal assembly 2380 or the power cord assembly 2600 is fully inserted relative to the food waste disposer 100, the respective round orifice 2334 or round orifice 2734 is aligned with the counterpart receiving orifice 2818 in the LEF 106 such that the respective fixing screw 2309 or fixing screw 2609 can be inserted and tightened so as to lock the respective assembly in position relative to the LEF.

Given these considerations, it should be appreciated that, in addition to the installation steps described above in regard to installation of the terminal assembly 2380 or power cord assembly 2600 relative to the food waste disposer 100, the present disclosure further envisions a process in which such installation is followed by de-installation and further installation or re-installation. For example, the present disclosure envisions that, when either the terminal assembly 2380 or power cord assembly 2600 is installed in regard to the food waste disposer 100, that terminal assembly or power cord assembly can subsequently be de-installed by a series of steps that are the inverse (or substantially the inverse) of the series of steps followed in achieving installation. Further, the present disclosure envisions that, if it was the terminal assembly 2380 that was de-installed from the food waste disposer 100, such de-installation can be followed by re-installation of the terminal assembly 2380 or further installation of the power cord assembly 2600 with respect to the food waste disposer 100. Likewise, the present disclosure envisions that, if it was the power cord assembly 2600 that was de-installed from the food waste disposer 100, such de-installation can be followed by re-installation of the power cord assembly 2600 or further installation of the terminal assembly 2380 with respect to the food waste disposer 100.

Additionally, the present disclosure envisions that, if the terminal assembly 2380 or the power cord assembly 2600 is de-installed from the food waste disposer 100, such de-installation can be followed by further installation of the terminal assembly 2380 or the power cord assembly 2600 with respect to another (or second) food waste disposer. Such further installation particularly is possible when the other (or second) food waste disposer, even though distinct from the food waste disposer 100, nevertheless has a LEF that is identical (or substantially similar) to the LEF 106— for example, in terms of having a generally-rectangular LEF opening that is identical (or substantially similar) to the generally-rectangular LEF opening 384. In such circumstances, the present disclosure envisions that, if it was the power cord assembly 2600 that was de-installed from the food waste disposer 100, such de-installation can be followed by further installation of either that power cord assembly 2600 or the terminal assembly 2380 with respect to the other (or second) food waste disposer, where the process of further installation of the power cord assembly 2600 or the terminal assembly 2380, respectively, can be identical to either the process described above concerning installation of the power cord assembly 2600 relative to the food waste disposer 100 or the process described above concerning installation of the terminal assembly relative to the food waste disposer 100, respectively.

Thus, the particular configuration of the terminal assembly 2380 and/or power cord assembly 2600 herein facilitates the removal and replacement of a first food waste disposer with another food waste disposer, for example, at the end of the operational life of the first food waste disposer or when it is otherwise determined that replacement should occur. Indeed, supposing that the food waste disposer 100 is first installed in an operating environment and coupled to receive power via one of the terminal assembly 2380 or the power cord assembly 2600, when that food waste disposer is removed/de-installed and another (e.g., second) food waste disposer is installed in place of the original food waste disposer 100, the terminal assembly 2380 or power cord assembly 2600 after being de-installed from the food waste disposer 100 can be readily coupled to the other food waste disposer provided that the LEF of the other food waste disposer is identical (or substantially similar) to the LEF 106. Alternatively, in a circumstance in which the food waste disposer 100 is de-installed and replaced by another food waste disposer, if it is desired at that time that the manner of providing power should be modified (e.g., from being provided via a power cord to being provided via Romex/BX hardwiring, or vice-versa), then the terminal assembly 2380 can be further installed relative to the second food waste disposer even though the power cord assembly 2600 was previously installed relative to the food waste disposer 100, or the power cord assembly 2600 can be further installed relative to the second food waste disposer even though the terminal assembly 2380 was previously installed relative to the food waste disposer 100.

It is specifically intended that the present invention not be limited to the embodiments and illustrations contained herein, but include modified forms of those embodiments including portions of the embodiments and combinations of elements of different embodiments as come within the scope of the following claims.

We claim:

1. A food waste disposer comprising:
   a motor;
   a switch module coupled to the motor and operable to control power to the motor; and
   a housing including a bottom housing portion and a top housing portion,
   wherein the switch module and motor are supported within an interior region within the housing;
   wherein each of the bottom housing portion and the switch module are configured to be capable of being coupled, at respectively a first time and a second time, to each of a terminal assembly by which the food waste disposer can receive power from a hardwired power link, and a power cord assembly by which the food waste disposer can receive power from a wall power outlet, respectively, wherein the bottom housing portion includes a surface to which either the terminal assembly or the power cord assembly can be coupled, the surface defining an orifice into which either a first start switch interface connector of the terminal assembly or a second start switch interface connector of the power cord assembly can be inserted so as to be at least partly positioned within the interior of the housing, and wherein the switch module includes a plurality of connectors, the plurality of connectors including a first start switch interface connector and a second start switch interface connector, that respectively can be coupled either to a plurality of first complementary formations of the first start switch interface connector when the terminal assembly is coupled to the surface at the first time or to a plurality of second complementary formations of the second start switch interface connector when the power cord assembly is coupled to the surface at the second time.

2. The food waste disposer of claim 1, further comprising a fastener receiving formation along the bottom housing portion that is arranged so that, when the terminal assembly is positioned along the surface, a first fastener can be affixed so as to attach the terminal assembly to the bottom housing portion or, when the power cord assembly is positioned along the surface, either the first fastener or a second fastener can be affixed so as to attach the power cord assembly to the bottom housing portion.

3. The food waste disposer of claim 2, wherein the fastener receiving formation is an orifice capable of receiving a first screw that is the first fastener, wherein the first screw is included by the food waste disposer.

4. The food waste disposer of claim 1, wherein the orifice defined by the surface includes first and second keying recesses along a perimeter of the orifice, wherein the first and second keying recesses are respectively configured to be complementary to first and second structural portions, respectively, provided on the terminal assembly, and also are respectively configured to be complementary to third and fourth structural portions, respectively, provided on the power cord assembly.

5. The food waste disposer of claim 4, wherein the orifice, first and second keying recesses, and switch module are configured so that each of:

(a) the terminal assembly can be moved from a first position outside of the housing toward the bottom housing and to a second position at least partly into the interior when the first and second keying recesses are aligned respectively with the first and second structural portions, respectively; and (b) the terminal assembly can be subsequently moved, in a direction substantially along the surface, from the second position to a third position so that the plurality of connectors respectively can be coupled the plurality of first complementary formations, respectively, of the first start switch interface connector.

6. The food waste disposer of claim 5, further comprising a fastener receiving formation along the bottom housing that is arranged so that, when the terminal assembly is in the third position, a first fastener can be affixed so as to attach the terminal assembly to the bottom housing.

7. The food waste disposer of claim 4, wherein the orifice, first and second keying recesses, and switch module are configured so that each of:

(a) the power cord assembly can be moved from a first position outside of the housing toward the bottom housing and to a second position at least partly into the interior when the first and second keying recesses are aligned respectively with the third and fourth structural portions, respectively; and (b) the power cord assembly can be subsequently moved, in a direction substantially along the surface, from the second position to a third position so that the plurality of connectors respectively can be coupled the plurality of second complementary formations, respectively, of the second start switch interface connector.

8. The food waste disposer of claim 7, further comprising a fastener receiving formation along the bottom housing that is arranged so that, when the power cord assembly is in the third position, a first fastener can be affixed so as to attach the power cord assembly to the bottom housing.

9. The food waste disposer of claim 1, wherein either a) a cover control switch cord extends between a primary body and a terminal cover of either the terminal assembly or the power cord assembly; or b) when the terminal assembly is coupled to the surface, a power link that is one of a Romex cable or a BX cable is also coupled by the terminal assembly to the switch module.

10. A food waste disposer system comprising the food waste disposer of claim 1, and further comprising either the terminal assembly or the power cord assembly.

11. A food waste disposer system comprising:

a waste disposer including a housing and a start switch; and a power cord assembly for implementation in regard to the waste disposer, the power cord assembly comprising:

a plug suitable for being coupled to a wall power outlet;

a terminal cover;

a power cord extending between the plug and a first surface of the terminal cover; and a start switch interface connector attached to a second surface of the terminal cover, wherein wires within the power cord are coupled to the start switch interface connector, wherein the start switch interface connector, power cord, terminal cover, and plug form an integrated assembly, and wherein the terminal cover is configured to be positioned along an exterior surface of the housing of the waste disposer so as to cover an orifice defined with that surface and so that the start switch interface connector extends at least partly into an interior within the housing and can be coupled to the start switch that is positioned within the housing, wherein each of a bottom housing portion of the housing and the switch module are configured to be capable of being coupled, at respectively a first time and a second time, to each of a terminal assembly by which the food waste disposer can receive power from a hardwired power link, and the power cord assembly by which the food waste disposer can receive power from a wall power outlet, respectively.

12. The food waste disposer system of claim 11, wherein the orifice defined by the surface of the housing includes first and second keying recesses along a perimeter of the orifice, wherein the first and second keying recesses are respectively configured to be complementary to first and second structural portions, respectively, provided on the terminal assembly, and also are respectively configured to be complementary to third and fourth structural portions, respectively, provided on the power cord assembly.

13. A method of implementing a first food waste disposer so as to be coupled to receive electric power, the method comprising:

providing the first food waste disposer including a motor, a switch module coupled to the motor and operable to control a power flow to the motor, and a housing including a bottom housing portion and a top housing portion, wherein the switch module and motor are supported within an interior region within the housing;

at a first time, coupling a power cord assembly to the first food waste disposer; and at a second time, coupling a terminal assembly to the first food waste disposer, wherein, when the power cord assembly is coupled to the switch module, the first food waste disposer can receive first power from a wall power outlet and, when the terminal assembly is coupled to the switch module, the first food waste disposer can receive second power from a hardwired power link, wherein each of the terminal assembly and the power cord assembly includes each of a respective start switch interface connector coupled to a respective terminal cover, wherein the coupling of the power cord assembly to the first food waste disposer includes first sliding the respective terminal cover of the power cord assembly in a first direction substantially along a surface of the bottom housing so that a plurality of connectors of the switch module are respectively coupled to a first plurality of complementary formations, respectively, of the respective start switch interface connector of the power cord assembly, and wherein the coupling of the terminal assembly to the first food waste disposer includes second sliding the respective terminal cover of the terminal assembly in the first direction substantially along the surface of the bottom housing so that the plurality of connectors of the switch module are respectively coupled to a second plurality of complementary formations, respectively, of the respective start switch interface connector of the terminal assembly.

14. The method of claim 13, wherein the coupling of the power cord assembly to the first food waste disposer additionally includes, after the first sliding, first implementing a first fastener so as to fasten the respective terminal cover of the power cord assembly to the surface, and wherein the coupling of the terminal assembly to the first food waste disposer additionally includes, after the second sliding, second implementing either the first fastener or a second fastener so as to fasten the respective terminal cover of the terminal assembly to the surface.

15. The method of claim 14, wherein the coupling of the power cord assembly to the first food waste disposer further includes, prior to the first sliding, first moving the power cord assembly from a first location outside of the housing to a second location at which the respective start switch interface connector is at least partly within in an interior of the housing, and wherein the coupling of the terminal assembly to the first food waste disposer further includes prior to the second sliding, second moving the terminal assembly from either the first location or a third location outside of the housing to either the second location or a fourth location at which the respective start switch interface connector is at least partly within the interior of the housing.

16. The method of claim 15, wherein the first fastener includes a screw, and wherein the first time occurs either prior to or after the second time.

17. A method of successively implementing a plurality of waste disposers including the first waste disposer and a second waste disposer, the method of successively implementing including the method of claim 14 and further comprising:

at a third time, decoupling the terminal assembly from the first food waste disposer; and at a fourth time, coupling the terminal assembly to the second waste disposer, wherein, when the terminal assembly is coupled to an additional switch module of the second waste disposer, the second food waste disposer can receive third power from the hardwired power link.

* * * * *